(12) United States Patent
Lou

(10) Patent No.: US 8,061,074 B2
(45) Date of Patent: Nov. 22, 2011

(54) AUTOMATIC FISHING DEVICE

(76) Inventor: Gary Enguo Lou, Fremont, CA (US)

( * ) Notice: Subject to any disclaimer, the term of this patent is extended or adjusted under 35 U.S.C. 154(b) by 96 days.

(21) Appl. No.: 12/502,216

(22) Filed: Jul. 13, 2009

(65) Prior Publication Data

US 2010/0071249 A1    Mar. 25, 2010

Related U.S. Application Data

(63) Continuation of application No. 11/216,828, filed on Aug. 30, 2005, now abandoned.

(60) Provisional application No. 60/522,211, filed on Sep. 1, 2004.

(51) Int. Cl.
*A01K 97/12* (2006.01)

(52) U.S. Cl. .................................. 43/15; 43/16

(58) Field of Classification Search ............... 43/15, 16
See application file for complete search history.

(56) References Cited

U.S. PATENT DOCUMENTS

| 3,889,413 A | 6/1975 | Snider |
| 4,034,498 A * | 7/1977 | Ikarimoto ................. 43/15 |
| 4,142,315 A | 3/1979 | Hoffman |
| 4,204,355 A | 5/1980 | Almond |
| 5,109,624 A * | 5/1992 | Bryan ................. 43/15 |
| 5,542,205 A | 8/1996 | Updike |

FOREIGN PATENT DOCUMENTS

| CN | 200410022219.8 | 1/2005 |
| CN | 200420033584.4 | 1/2005 |

* cited by examiner

*Primary Examiner* — Christopher P Ellis

(57) ABSTRACT

The current invention is an automatic fishing device for setting the hook upon fish strike. It can be used as an adaptive device for existing fishing assembly, or to be integrated into new fishing assembly. It embodies a weight, a weight support and a fish line coupler with a clip for connecting the weight to the fish line. The weight has a groove for engage the fish line, an opening for engage or disengage the weight onto or from the weight support. The weight can be either engaged or dis-engaged, determined by the position and the shape of the opening relative to the position and the shape of the weight support, respectively. When the movement of fish line caused by fish strike rotates the initially engaged weight to be disengaged, the falling weight will drag the fish line downward, effectively pulling the line and setting the hook.

2 Claims, 14 Drawing Sheets

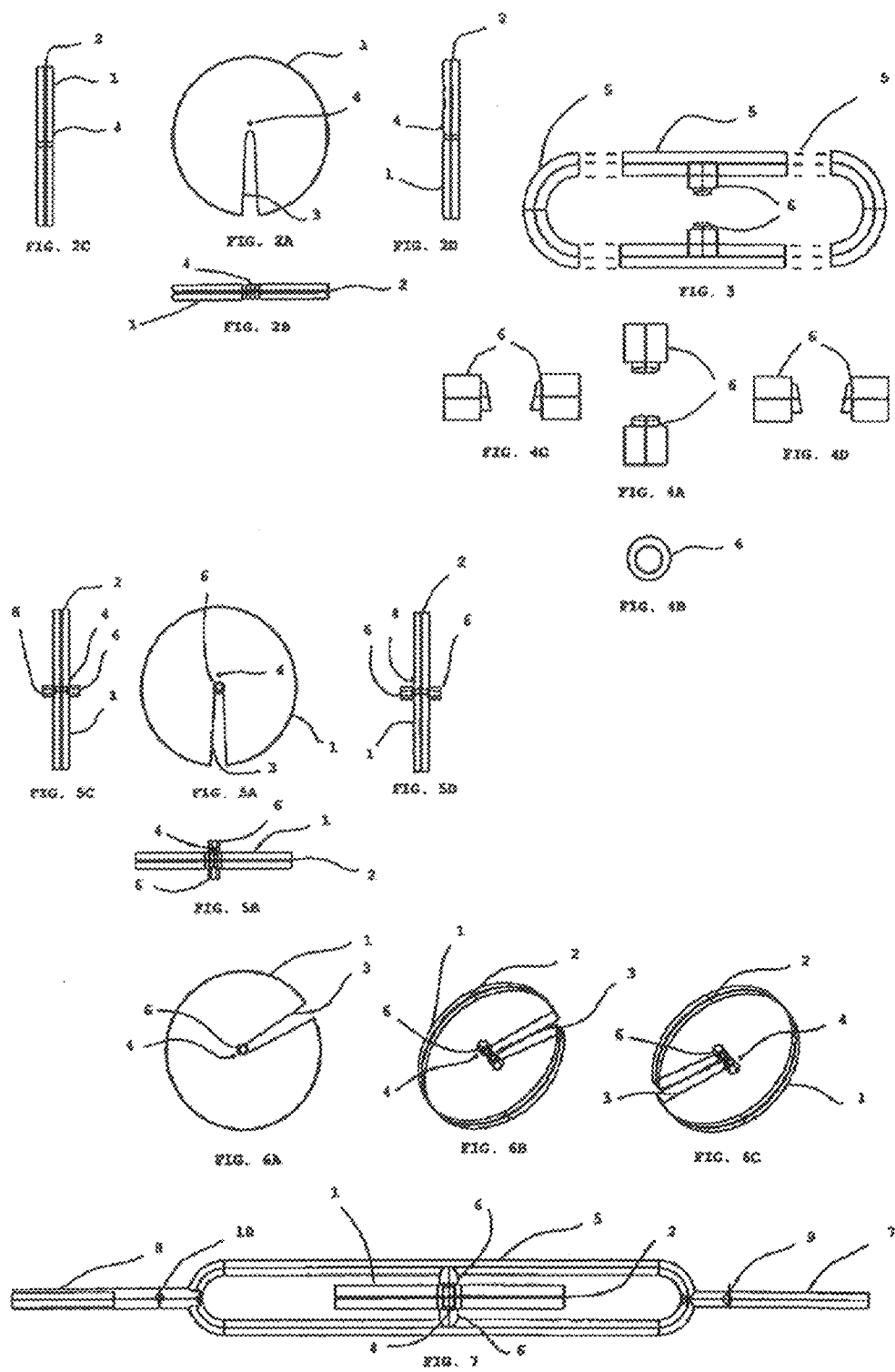

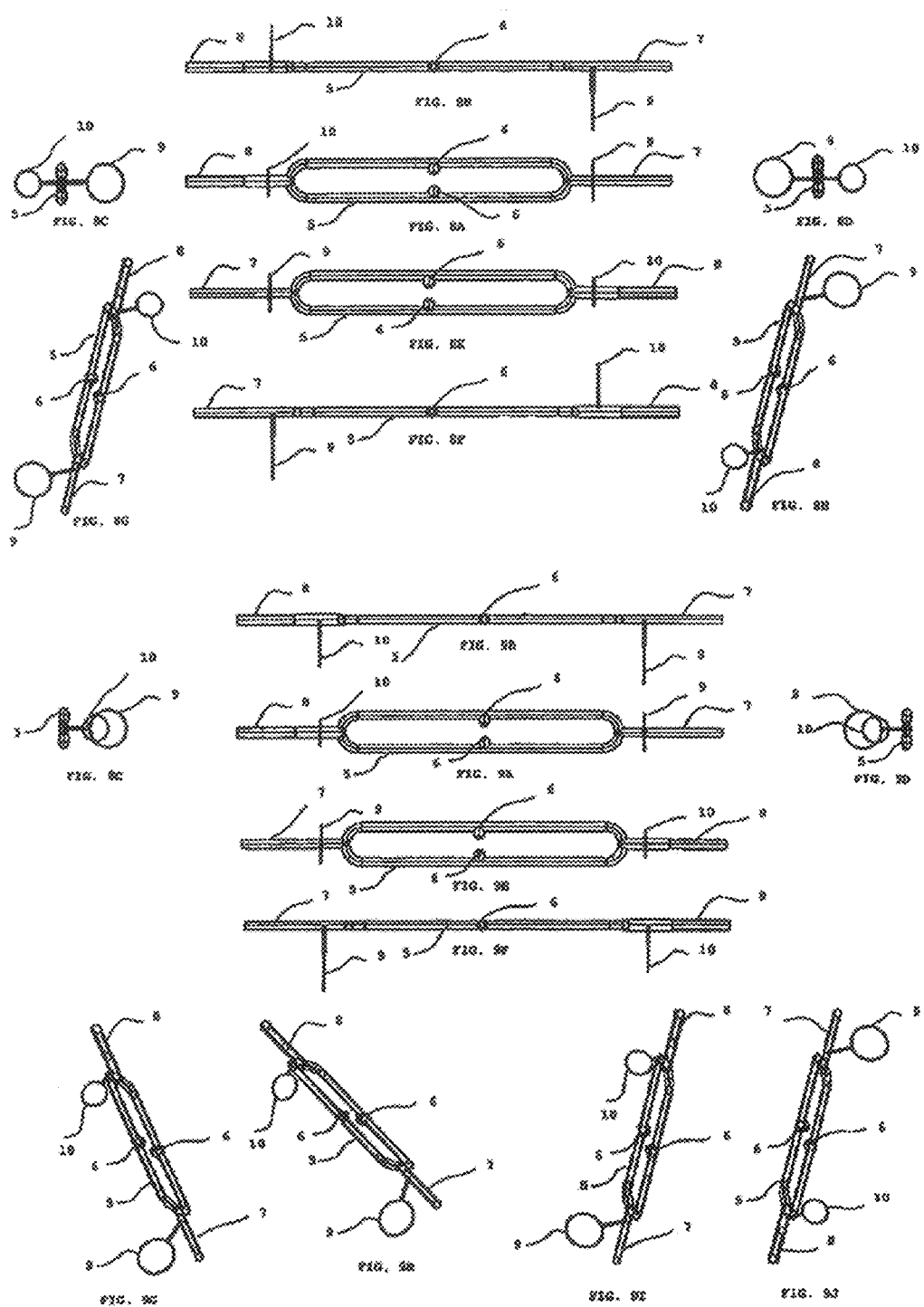

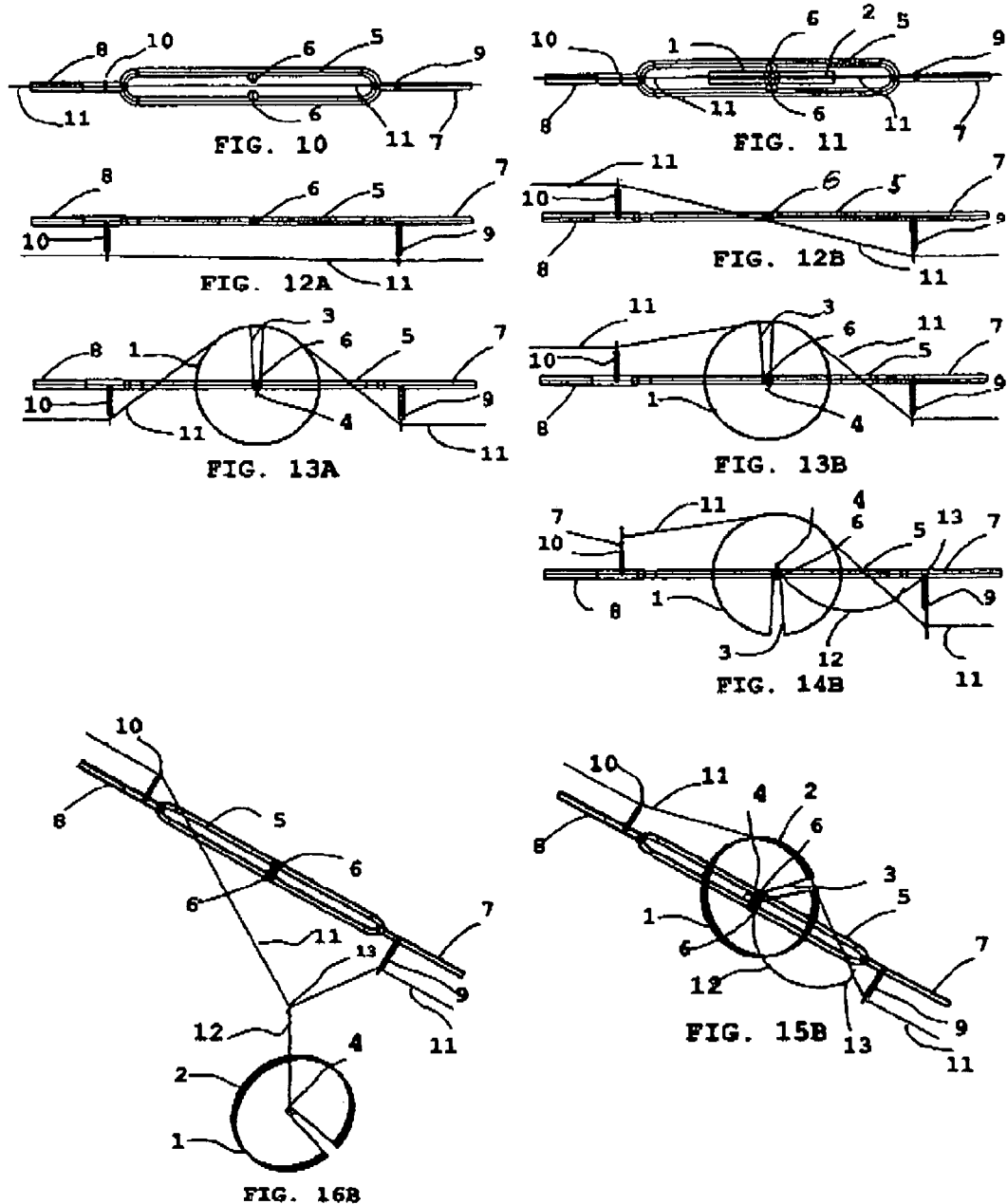

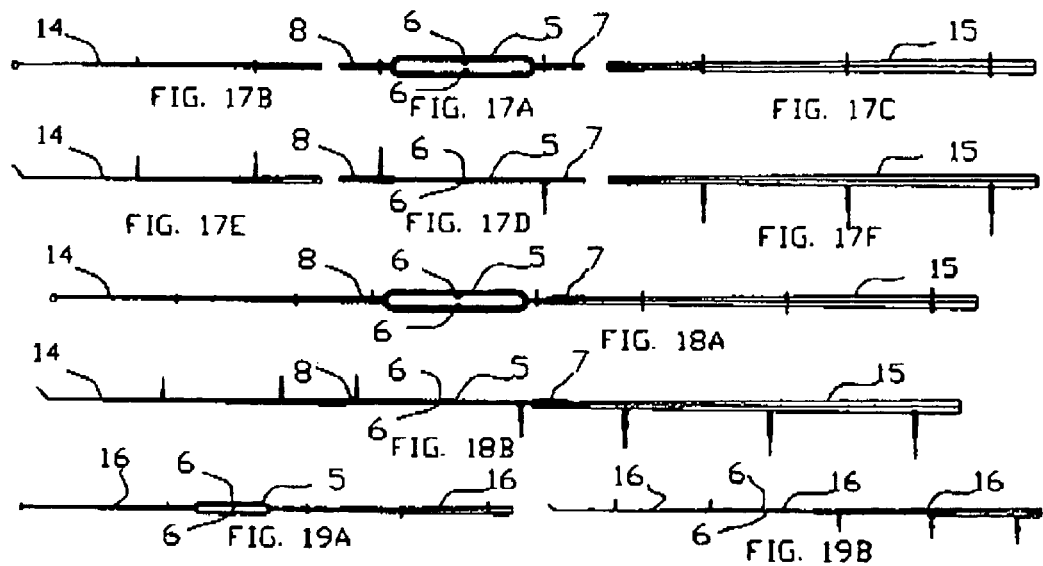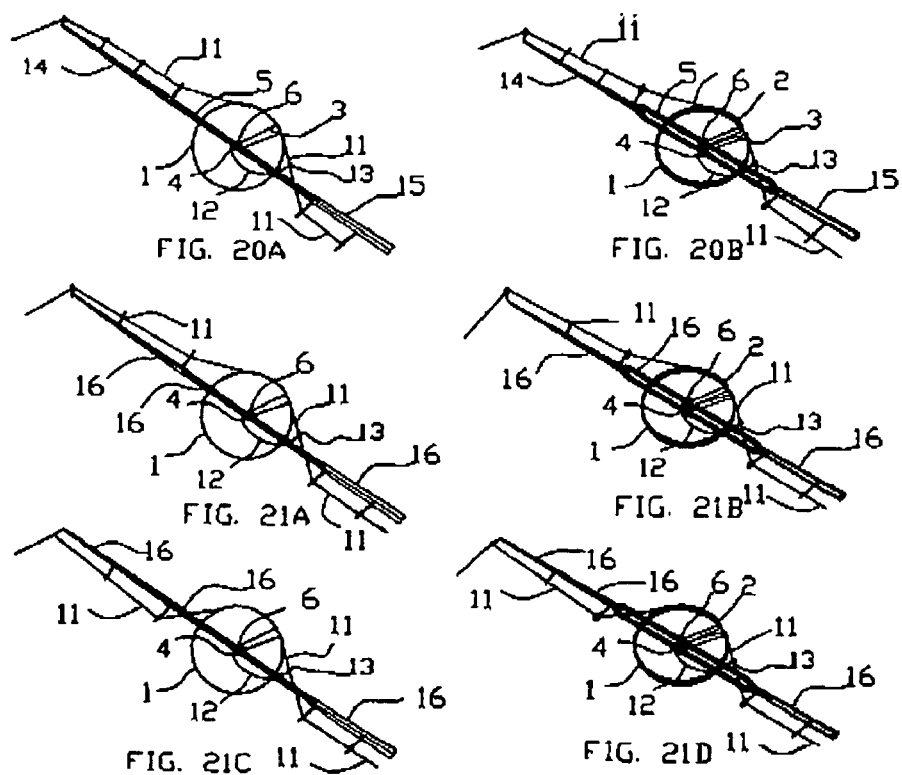

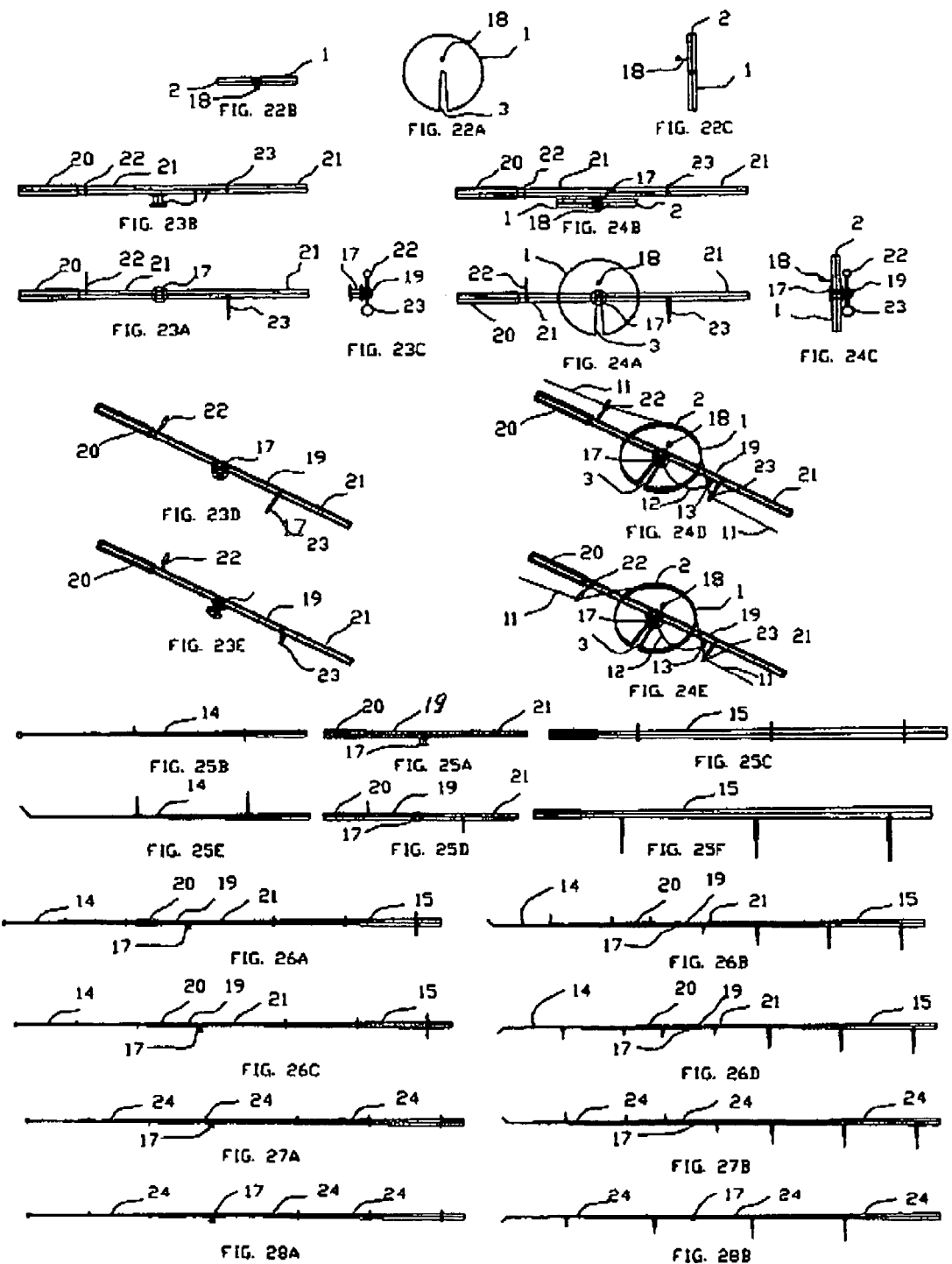

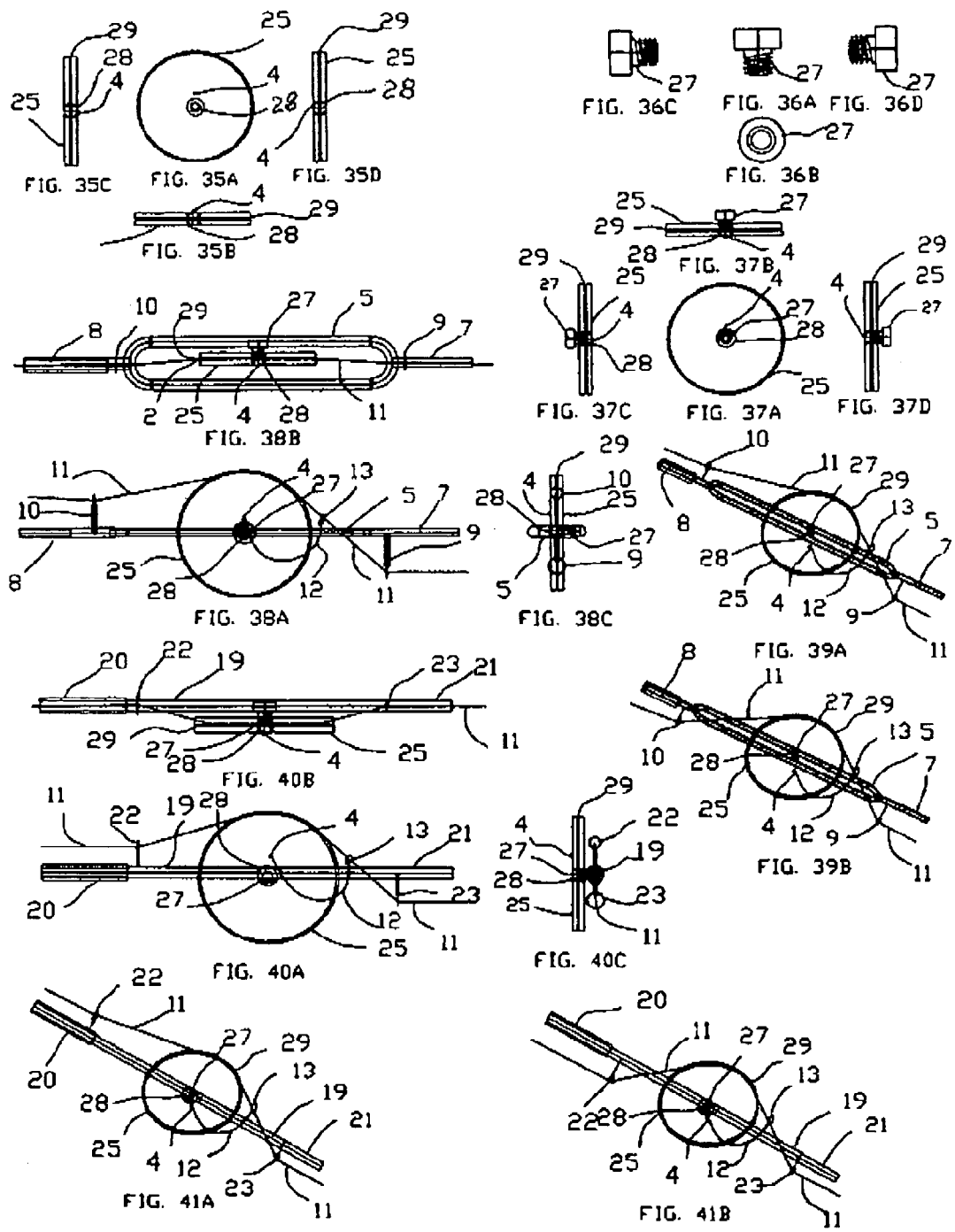

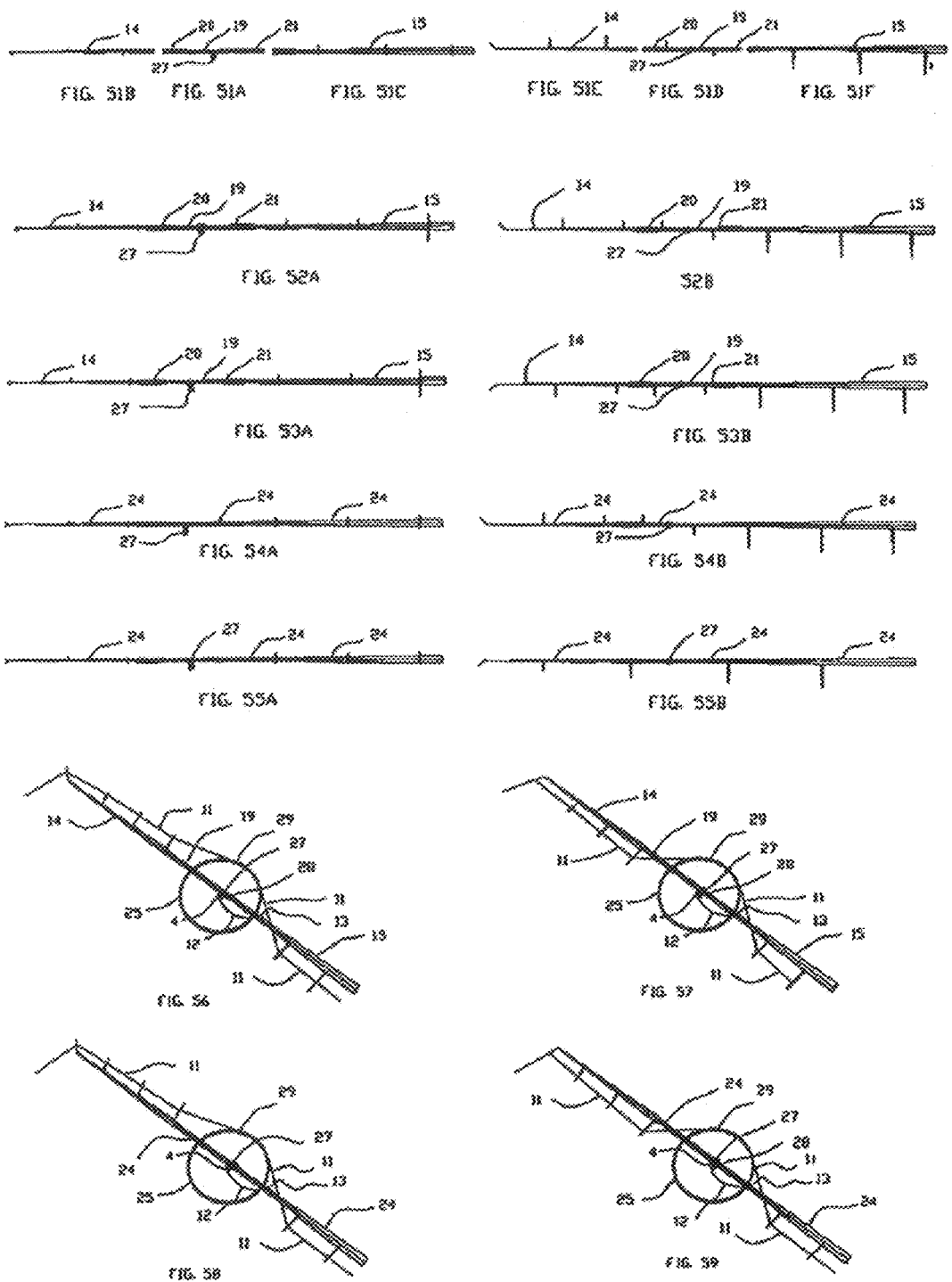

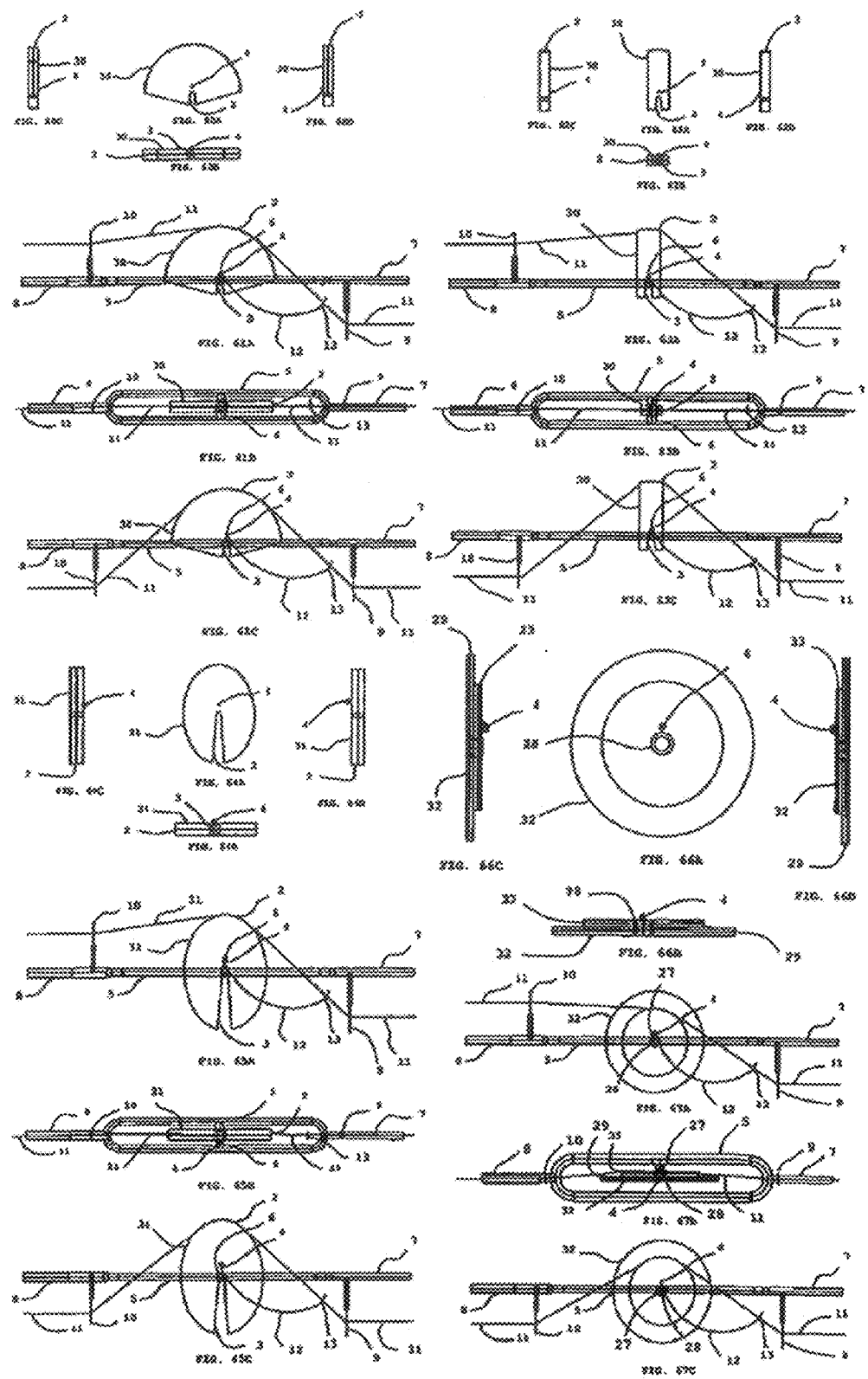

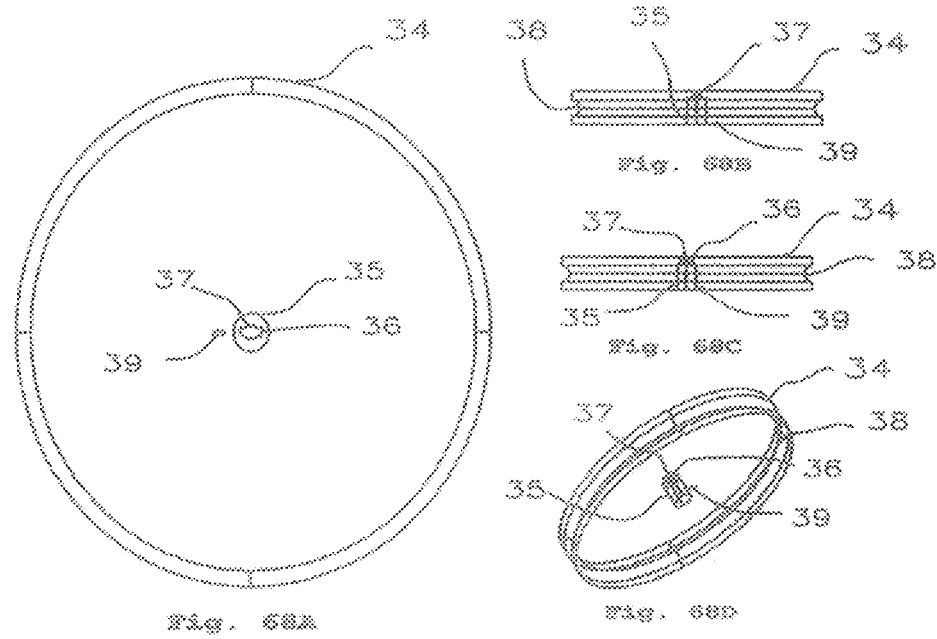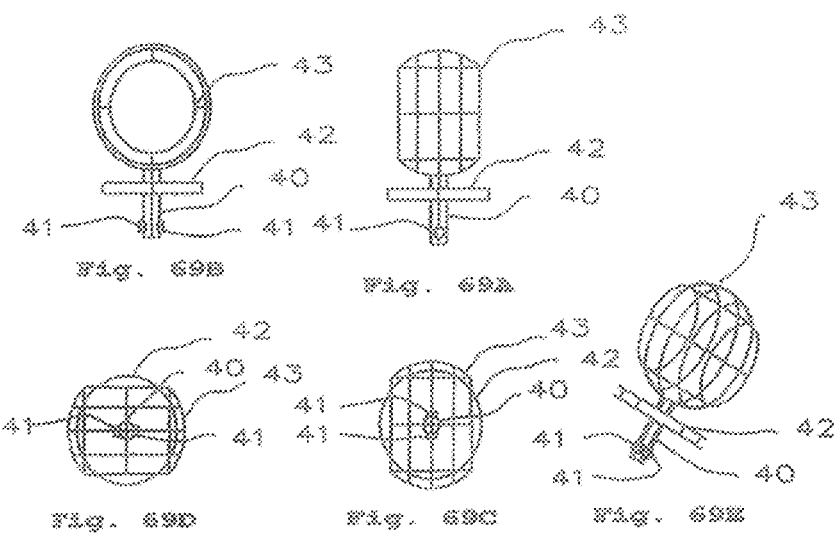

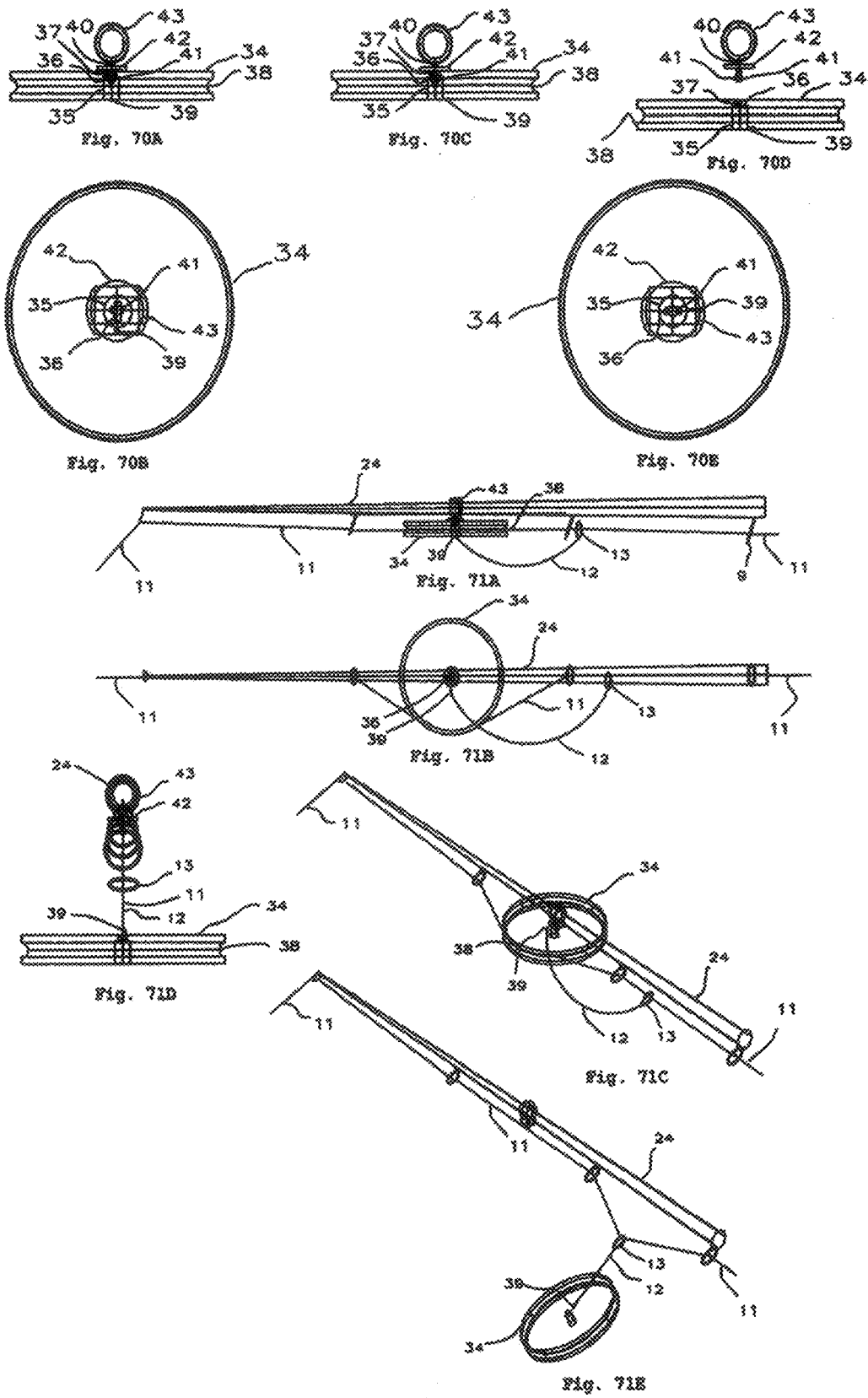

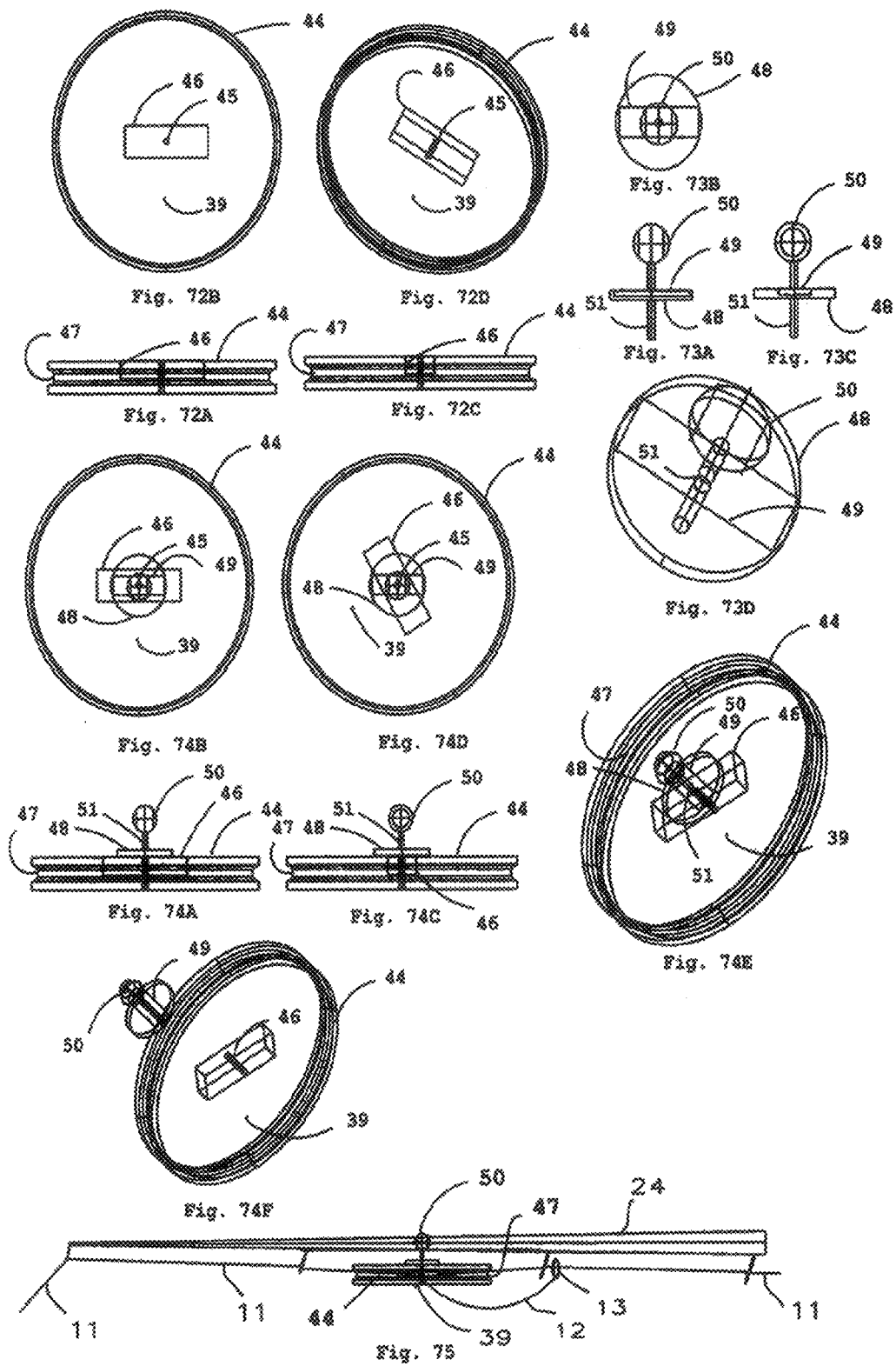

AUTOMATIC FISHING DEVICE

BACKGROUND OF INVENTION

Numerous existing automatic fishing and automatic hook setting devices use combination of a spring device and trigger device to either lift the fishing rod upward, or to pull the fish line, upon fish strikes. Many of these inventions are fishing rod holder devices. The spring device used in these rod holder type devices is to store energy for lifting the fishing rod. The trigger device is used to transforming the tug of the line by a fish strike to trigger the release of energy stored in the spring device. U.S. Pat. No. 3,889,413, issued on Jun. 17, 1979 to Robert T. Snider and Jessie G. Zimmerman, U.S. Pat. No. 4,142,315, issued on May 2, 1977 to Gary J. Hoffman, and U.S. Pat. No. 5,542,205, issued on Aug. 6, 1996 to Lester Updike is among this type of inventions. The spring device and trigger device in such cases mimic the use of energy stored in the human muscle and the reaction of a fisherman to the fish strike.

Combination of a spring device and trigger device usually means that the manufacturing processes of those devices are likely to be complicated, and the cost can be high. Many fishing rod holder devices are also heavy, not practical to carry around, or easy to setup. Not easy to use and high cost limits the practical application and market acceptance of those devices.

Besides using spring as the store of energy in automatic fishing devices, there are a few inventors use weight instead of spring to store energy. U.S. Pat. No. 4,204,355 issued on May 27, 1980 to William C. Almond, describes a simple automatic fish catcher using a weight for pulling the fish line. This fish catcher uses a horizontal support arm to hang a weight, and the fish line is attached to the weight so that the tightening of the fish line by fish strikes will drag the weight out of the horizontal support arm, causing the weight to fall and pulling the fish with it. Although it is a low cost and easy to use device for automatic fishing, this device has certain shortcomings. First, the weight support arm has to be set up horizontally. Out of horizontal position will either cause the weight to fall by itself, or make it harder for fish to move the weight outward to fall. Unless the fish is firmly hooked at the beginning of the strike, the biting fish may give up the bite since it has to apply considerable force to move such weight outward. This may reduce the effectiveness of the device. Second, the objectives of the device is also lifting a hooked fish to the water surface, this means that the weight needs be proportional to the weight of the fish, which is usually unknown before the fish is surfaced. Third, the weight of this device need considerable falling height to lift hooked fish to the water surface, it is not suitable in place of shallow water. Forth, this device combines automatic hook setting and automatic fish catcher in one very simple device; this make it difficult to achieve both goals well. Fifth, this device only works when the direction of the fish bite is away from the fishing device to cause the tightening of the fish line. If fish bites in opposite direction, setting the fish line loose, the weight will stay still, giving opportunity for the fish to escape.

In fact, many automatic fishing devices only work when fish is biting away from the fishing device. They depend on the tightening of fish line to trigger the hook setting devices. They are ineffective when fish is biting toward the fishing device, in such case the fish line is loosening instead of tightening. In general, when movement of the fish cause the fish line to loose, it is much harder for an angler to react, regardless whether an automatic fishing device is used or not. Since it is hard to detect the loosening of the line, and even harder to have a good timing to pull the line.

SUMMARY

The present invention provides an automatic fishing device, or more specifically, an automatic hook setting device comprising a weight, a weight support, an anchor for weight support, a fish line, two line guides, and a fish line coupler and a clip for connecting the weight to the fish line.

The weight is shaped to have an opening, a fish line groove for securing the contact between the weight and fish line, a anchor for attaching the fish line coupler that connects the weight to the fish line. The opening can be a cut off gap on the weight, obviously to see the structural differences from the rest of the weight; or it can be just an end of the female thread that can end the coupling contact with a male thread on the weight support. The opening can also be a magnetic body fixed on the weight; its relative position to another magnetic body fixed on the weight support determines whether the weight support can attract and support the weight or cannot support the weight. Same as the opening created by the cut off gap, or the opening created by the male and female thread, whether the weight can be supported by the weight support is determined by the relative position between the weight and the weight support.

The weight support is shaped to be able to support the weight in certain position but not support the weight in other positions that can be called the opening positions. The transition from non-opening positions to opening positions is usually caused by rotation of the weight on the weight support. The shapes of the weight support and the weight are matched so that the rotation of the weight can cause the weight to fall. Most contact surface between the weight and weight support is curved, allowing the weight to be supported and to be able to rotate on the weight support. The shape of the opening positions on the weight disallows the weight to be supported by the weight support. The weight is initially setup to be supported by the weight support, and the fish line is made in contact with the fish line groove on the weight. The fish line coupler that is anchored on the weight is then connecting the weight to the fish line by clipping the fish line clip onto the fish line. When fish strikes, the tightening or the loosening of the fish line rotates the weight. The rotation of the weight changes the position of the opening positions on the weight. The weight eventually will fall from the weight support when the opening on the weight is rotated to the opening position that disallows the weight to be supported any longer. The falling weight in turn drags the fish line downward, effectively pulling the fish line and setting the hook.

The weight support can be part of an ordinary fishing rod itself; regardless the rod is one-piece construction or multi-sectional type. It can be a permanent part of a fishing rod, or an addition to the rod mountable to and removable from the rod. In these cases, the fishing rod is the anchor of the weight support. A weight support adaptor can also be the anchor of the weight support for adapting the weight support onto a new or an existing fishing device.

The weight support adaptor is a device for mounting or anchoring the weight support, and for attaching the weight support to a fishing rod, or other existing or new fishing devices. Another use of it is to secure the adequate contact between the weight and the fish line by using two line guides on the weight support adaptor. The weight support adaptor can be attached to another fishing device, such as a multi-sectional fishing rod by fitting its male tip into the female tip of a multi-sectional fishing rod, and fitting the male tip of that rod into the female tip of the weight support adaptor. For such uses, the anchor for weight support is the weight support adaptor. If the weight support is integrated into a fishing rod or other fishing devices with suitable line guides, these devices provide functions of the weight support adaptor; they become the anchor for weight support.

The use of two line guides is to secure the adequate contact between the weight and the fish line so that the rotation of the weight by the moving fish line will be smooth and no skipping. If the weight support is a permanent part of a fishing rod, two nearest line guides on each side of the weight support may provide this functionality. In this case, weight support adaptor is not needed. The distance between these two line guides should not be eight too far apart, or too close to each other. If they are too far apart, the fish line may not be able to rotate the weight properly. If they are too close to each other, resistance to the rotation of the weight will increase and sensibility of the device will decrease. If the weight support adaptor is not a permanent part of a fishing rod, one or two line guides can be mounted on the weight support adaptor.

The coupler for attaching weight to the fish line is a flexible line that is anchored on the weight and attachable to the fish line by a fish line clip, so that the falling weight can drag down the fish line. There is an anchor on the weight for tying up one end of the coupler, and a clip on another end of the coupler for attaching or removing the coupler from the fish line.

The elements of current invention are the weight, the weight support, the anchor of the weight support, line guides, the fish line and the coupler for connecting the weight and the fish line. The weight is shaped to have a groove to support the fish line, an opening for engage to the weight support and disengage it from the weight support, and an anchor for connecting the fishing line coupler. The relative positions between the weight and the weight support determine whether the weight can be supported by the weight support or not. When fish strikes, the tightening or loosening of the fish line will rotate the weight, causing the weight to fall from an initially supported position on the weight support. The falling weight will drag the fish line down, tightening the fish line and setting the hook.

DRAWINGS—DESCRIPTIONS

FIG. 1A is the front view of the preferred embodiment 1. On this figure, the opening 3 of the weight 1 is facing downward and the weight 1 is supported by the weight support 6. The fish line coupler 12 is connected to both the weight 1 and the fish line 11 through line anchor 4 and fish line clip 13. Line guide 9 on the weight support adaptor 5 is facing downward, and line guide 10 is facing upward. Fish line 11 goes through line guide 9, inner space of the weight support adaptor 5, the fish line groove 2 of the weight 1 and line guide 10.

FIG. 1B is the top view of the preferred embodiment 1. The FIG. 1B is illustrating the same embodiments as in FIG. 1A.

FIG. 1C is the perspective view of the preferred embodiment 1. The weight 1 is rotated to have its opening 3 upward close to a position at which the weight 1 will fall from the weight support 6.

FIG. 1D is the perspective view of the preferred embodiment 1. FIG. 1D is illustrating the falling of weight 1 from weight support 6, if the weight 1 continue to rotate counter clockwise from the position shown on FIG. 1C. On FIG. 1D, Fish line 11 is dragged down by weight 1 through fish line clip 13, line coupler 12 and line anchor 4.

FIG. 2A, FIG. 2B, FIG. 2C and FIG. 2D are the front view, the bottom view, the left view and the right view of the weight 1, respectively.

FIG. 3 is the enlarged partial top view of the weight support 6 and weight support adaptor 5, emphasizing the position and shape of the weight support 6.

FIG. 4A, FIG. 4B, FIG. 4C and FIG. 4D are enlarged top view, front view, left view and right view of the weight support 6.

FIG. 5A, FIG. 5B, FIG. 5C and FIG. 5D are the front view, the bottom view, the left view and the right view of the weight 1 and weight support 6. The weight 1 is supported on the weight support 6 with the opening 3 of the weight 1 facing downward.

FIG. 6A is the front view of weight 1 on weight support 6. The opening 3 of the weight 1 is rotated upward close to the position at which weight 1 will fall from the weight support 6.

FIG. 6B is the perspective view of weight 1 on weight support 6. The position of the opening 3 of the weight is the same as the FIG. 6A.

FIG. 6C is the perspective view of weight 1 on weight support 6. The position of the opening 3 of the weight 1 is the opposite of that shown on FIG. 6B, after the weight 1 is turned 180 degree on the weight support 6.

FIG. 7 is the top view of the weight 1, the weight support 6 and the weight support adaptor 5 after the weight 1 is placed onto and weight support 6. Female tip 8 of the adaptor 5 is on the left and the male tip 7 of the adaptor 5 is on the right. Line guide 10 is on the left and line guide 9 is on the right.

FIG. 8A through FIG. 8F are top view, front view, left view, right view, bottom view and back view of the weight support 6, weight support adaptor 5 with line guide 9 and 10 on each side. Line guide 9 is facing down and 10 is facing up.

FIG. 8G and FIG. 8H are perspective views of the weight support 6 and weight support adaptor 5. On FIG. 8G, the female tip 8 of the weight support adaptor 5 is on the top. On FIG. 8H, the male tip 7 of the weight support adaptor 5 is on the top.

FIG. 9A through FIG. 9F are top view, front view, left view, right view, bottom view and back view of the weight support 6, weight support adaptor 5 with line guide 9 and 10 on each side. Both line guide 9 and 10 are facing down.

FIG. 9G through FIG. 9I are perspective views of the weight support 6 and weight support adaptor 5. The female tip 8 of the weight support adaptor 5 is in the upper position. The male tip 7 of the weight support adaptor 5 is in the lower position.

FIG. 9J is the perspective views of weight support 6 and weight support adaptor 5. The male tip 7 of weight support adaptor 5 is in the upper position.

FIG. 10 is the top view of weight support 6 and weight support adaptor 5 with fish line 11 passes through two line guides 9 and 10.

FIG. 11 is the top view of the weight support 6 and weight support adaptor 5 with the weight 1 placed onto the weight support 6. In addition to the fish line 11 passing through two line guides 9 and 10, it also passes through the fish line groove 2 of the weight 1.

FIG. 12A is the front views of weight support 6 and weight support adaptor 5 with fish line 11 passing through two line guides 9 and 10. Both line guides are facing downward.

FIG. 12B is the front views of weight support 6 and weight support adaptor 5 with fish line 11 passing through two line guides 9 and 10. Line guide 9 is facing downward and Line guide 10 is facing upward.

FIG. 13A and FIG. 13B are front views of weight 1, weight support 6 and weight support adaptor 5 with fish line 11 passing through two line guides 9 and 10 and also passing through the fish line groove 2 of the weight 1. On FIG. 13A, both line guides are facing downward. On FIG. 13B, line guide 9 is facing downward and line guide 10 is facing upward. The weight 1 has its opening 3 facing upward against the weight support 6.

FIG. 14B are front views of weight 1, weight support 6 and weight support adaptor 5 with fish line 11 passing through two line guides 9 and 10 and also passing through the fish line groove 2 of the weight 1. The fish line coupler 12 connects weight 1 to fish line 11 through fish line clip 13. On FIG. 14B, line guide 9 is facing downward and line guide 10 is facing upward. The weight 1 has its opening 3 facing downward against the weight support 6.

FIG. 15B is the perspective view of what is shown on FIG. 14B after the weight 1 is rotated to have the opening 3 close to the position at which the weight will fall.

FIG. 16B is the perspective view of the weight 1 falling from the weight support 6 from the position shown on FIG. 15B, after the weight is rotated more against the weight support 6 to reach the falling position.

FIG. 17A is the top view of the weight support 6, and the weight support adaptor 5 showing its female tip 8 on the left side and male tip 7 on the right side.

FIG. 17B is the top view of the upper section of a sectional fishing rod with a male tip on the right side. The size of the female tip 8 of FIG. 17A and the size of the male tip on FIG. 17B are matching each other.

FIG. 17C is the top view of the lower section of sectional fishing rod with a female tip on the left side. The size of the male tip 7 of FIG. 17A and the size of the female tip on FIG. 17C are matching each other.

FIG. 17D, FIG. 17E and FIG. 17F are front view of what is show on FIG. 17A, FIG. 17B and FIG. 17C, respectively.

Figure 1A:
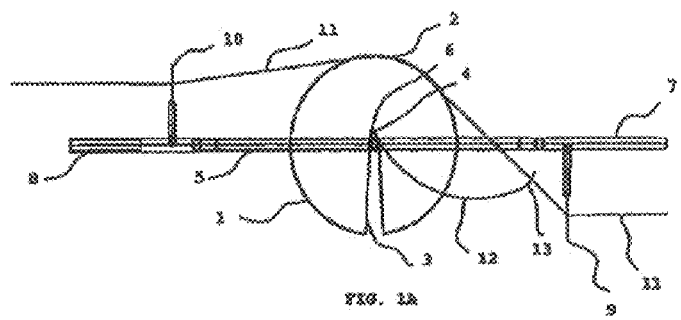
Figure 1B:
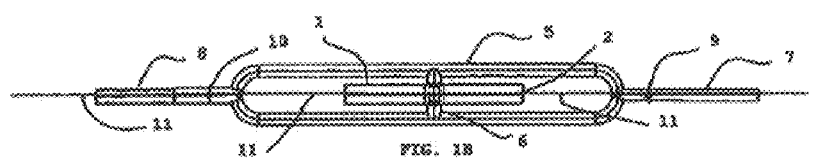

FIG. 18A is the top view of the installation of weight support adaptor 5 on both the upper section and the lower section of the sectional fishing rod shown on FIG. 17B and FIG. 17C, after fitting the male tip of the upper section of the rod into the female tip 8 of the weight support adaptor 5, and fitting the male tip 7 of the weight support adaptor 5 into female tip of the lower section of the fishing rod.

FIG. 18B is the front view of what is shown on FIG. 18A.

FIG. 19A is the top view of the integrated fishing rod. Part of weight support adaptor 5 shown on FIG. 17A became a permanent part of the rod. The female tip and male tip of the weight support adaptor 5 are eliminated by the integration. Two nearest line guides close to weight support 6 provide functionality of the line guide 9 and 10.

FIG. 19B is the top view of what is shown on FIG. 19A.

FIG. 20A and FIG. 20B are front view and perspective view of the preferred embodiment 3, respectively. The weight 1 is placed on weight support 6 and fish line 11 is passing through the fish line groove 2 of the weight 1. The opening of the weight is close to the position to allow the weight to fall. The coupler 12 anchored on anchor 4 is connecting the weight 1 to fish line 11 by clip 13. The weight support adaptor 5 is fitted to sections of the fishing rod as shown on FIG. 18B. Line guides on the left of the weight support 6 are facing up and line guides on the right of the weight support 6 are facing down.

Figure 1C:
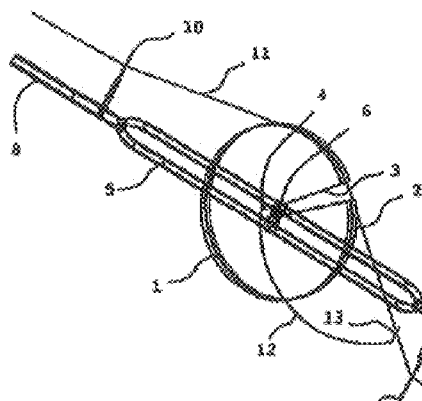

FIG. 21A and FIG. 21B are front view and perspective view of the preferred embodiment 5, respectively. Parts of embodiment 1 shown on FIG. 1C are integrated into fishing rod 16. The female tip 8 and male tip 7 are eliminated. Line guide 9 and 10 are eliminated also, since line guide to the left and to the right of weight support 6 provide functionality of the line guide 9 and 10.

Figure 1E:
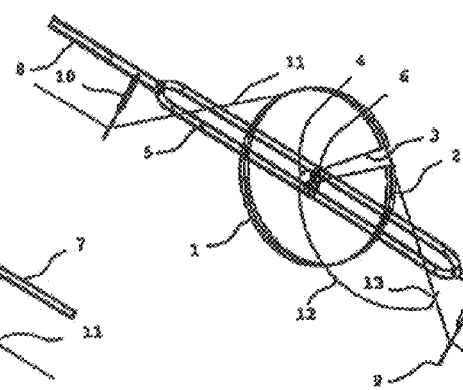
Figure 1D:
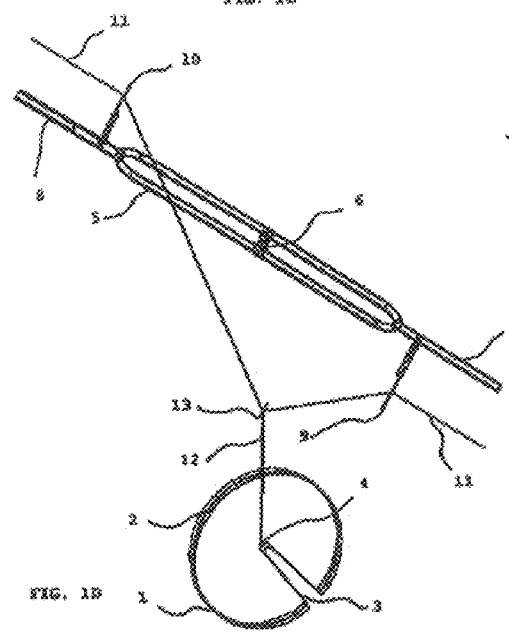
Figure 1F:
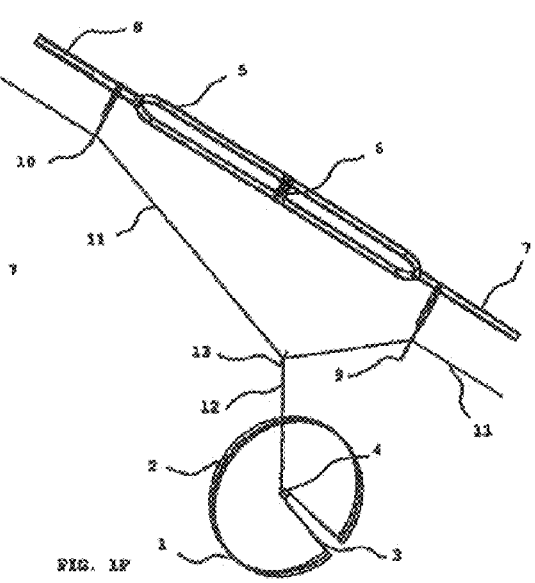

FIG. 21C and FIG. 21D are front view and perspective view of the preferred embodiment 6, respectively. Parts of embodiment 2 shown on FIG. 1E are integrated into fishing rod 16. The female tip 8 and male tip 7 are eliminated. Line guide 9 and 10 are eliminated also, since line guide to the left and to the right of weight support 6 provide functionality of the line guide 9 and 10. All line guides are facing downward.

FIG. 22A, FIG. 22B and FIG. 22C are respective front view, top view and right view of a weight 1, and anchor 18 on weight 1 for attaching fish line coupler.

FIG. 23A, FIG. 23B and FIG. 23C are respective front view, top view and right view of weight support 17, weight support adaptor 19 and line guides 22 and 23.

FIG. 23D and FIG. 23E are perspective views of what is shown on FIG. 23A, FIG. 23B and FIG. 23C.

FIG. 24A, FIG. 24B and FIG. 24C are respective front view, top view and right view of weight 1, weight support 17, weight support adaptor 19 and line guides 22 and 23. The weight 1 is supported by the weight support 17. The opening of the weight 1 is facing downward.

FIG. 24D is perspective view of preferred embodiment 7. The weight 1 is placed on the weight support 17, and fish line 11 is passing through the fish line groove 2 of the weight 1. The opening 3 of the weight 1 is facing down. The fish line coupler 12 connects weight 1 to fish line 11 by anchor 18 and fishing clip 13. Line guide 23 on the weight support adaptor 19 is facing downward, and line guide 22 is facing upward.

FIG. 24E is perspective view of preferred embodiment 8. FIG. 24E is similar to FIG. 24D, except both line guide 22 and 23 are facing downward.

FIG. 25A is the top view of the weight support 17, and weight support adaptor 19 showing its female tip 20 on the left side and male tip 21 on the right side.

FIG. 25B is the top view of the upper section of a multi-sectional fishing rod with a male tip on the right side. The male tip has a matching size to fit the female tip 20 of weight support adaptor 19.

FIG. 25C is the top view of the lower section of the multi-sectional fishing rod with a female tip on the left side. The female tip has a matching size to fit the male tip 21 of weight support adaptor 19.

FIG. 25D is front views of what is shown on FIG. 25A; FIG. 25E is front views of what is shown on FIG. 25B and FIG. 25F is front views of what is shown on FIG. 25C.

FIG. 26A is the top view of the installation of weight support adaptor 19 on both upper section 14 and lower section 15 of a multi-sectional fishing rod shown on FIG. 25B and FIG. 25C, after fitting the male tip of the upper section of the rod into the female tip 20 of the weight support adaptor 19, and fitting the male tip 21 of the weight support adaptor 19 into the female tip of the lower section of the fishing rod.

FIG. 26B is the front view of what is shown on FIG. 26A. Line guides to the left of weight support 17 are facing up and the rest are facing down.

FIG. 26C and FIG. 26D is similar to FIG. 26A and FIG. 26B, respectively. The difference is that all line guides are facing down.

FIG. 27A is the top view of the integrated fishing rod 24. Part of weight support adaptor 19 shown on FIG. 23B becomes a permanent part of the rod. The female tip 20 and male tip 21 of the weight support adaptor 19 are eliminated by the integration. Line guide 22 and 23 are eliminated also since line guide to the left and to the right of weight support 17 provide functionality of the line guide 22 and 23.

FIG. 27B is the front view of what is shown on FIG. 27A. Line guides to the left of weight support 17 are facing up and the rest are facing down.

FIG. 28A is the top view of the integrated fishing rod 24. Part of weight support adaptor 19 shown on FIG. 23B become a permanent part of the rod. The female tip 20 and male tip 21 of the weight support adaptor 19 are eliminated by the integration. Line guide 22 and 23 are eliminated also, since line guide to the left and to the right of weight support 17 provide functionality of the line guide 22 and 23.

FIG. 28B is the front view of what is shown on FIG. 28A. All line guides are facing down.

Figure 29A:
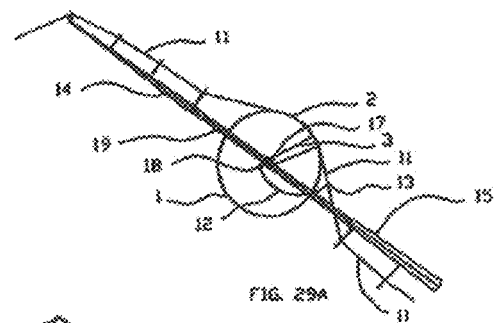

FIG. 29A is the front view of the preferred embodiment 9. The weight 1 is placed on the weight support 17 and fish line 11 is passing through the fish line groove 2 of the weight 1. The opening 3 of the weight 1 is close to the position at which the weight will fall. The coupler 12 connects weight 1 and the fish line 11 by anchor 18 and fishing clip 13. The weight support adaptor 17 is fitted to sections of the fishing rod as shown on FIG. 26B. Line guides to the left of the weight support 17 are facing up and line guides to the right of the weight support 17 are facing down.

Figure 29B:
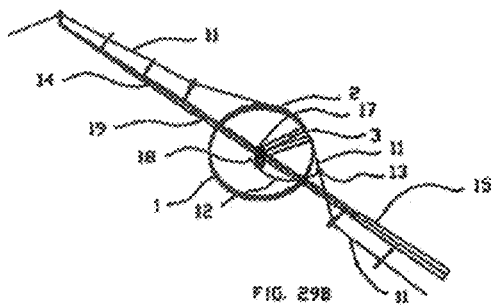

FIG. 29B is the perspective view of what is shown on FIG. 29A.

Figure 30A:
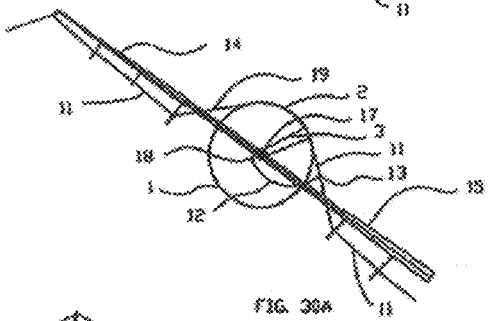

FIG. 30A is the front view of the preferred embodiment 10. FIG. 30A is similar to FIG. 29A, except that all line guides are facing down.

Figure 30B:
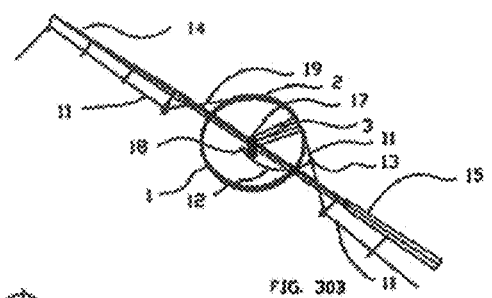

FIG. 30B is the perspective view of what is shown on FIG. 30A.

Figure 31A:
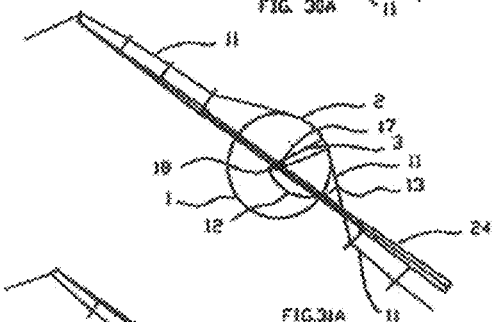

FIG. 31A is the front view of the preferred embodiment 11. FIG. 31A shows an integrated fishing rod 24. Parts of embodiment 7 shown on FIG. 24D become permanent parts of the rod. The female tip 20 and male tip 21 of the weight support adaptor 19 are eliminated by the integration. Line guide 22 and 23 are eliminated also, since line guide to the left and to the right of weight support 17 provide functionality of the line guide 22 and 23.

Figure 31B:
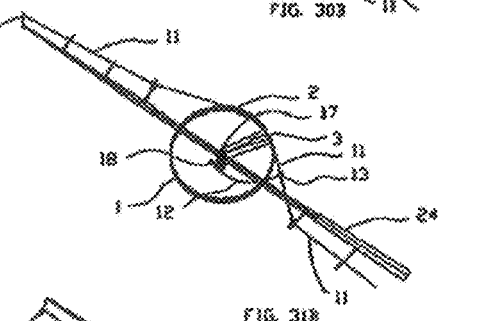

FIG. 31B is the perspective view of what is shown on FIG. 31A.

Figure 32A:
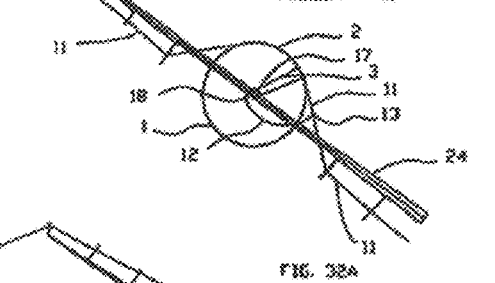

FIG. 32A is the front view of the preferred embodiment 12. FIG. 32A shows an integrated fishing rod 24. Parts of embodiment 8 shown on FIG. 24E become permanent parts of the rod. The female tip 20 and male tip 21 of the weight support adaptor 19 are eliminated by the integration. Line guide 22 and 23 are eliminated also, since line guide to the left and to the right of weight support 17 provide functionality of the line guide 22 and 23. All line guides are facing down.

Figure 32B:
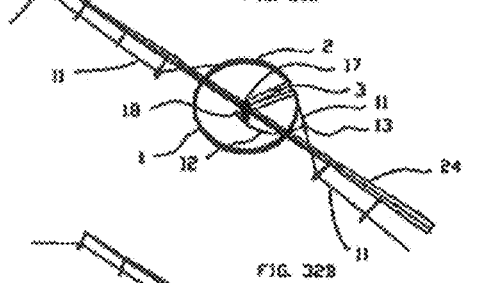

FIG. 32B is the perspective view of what is shown on FIG. 32A.

Figure 33:
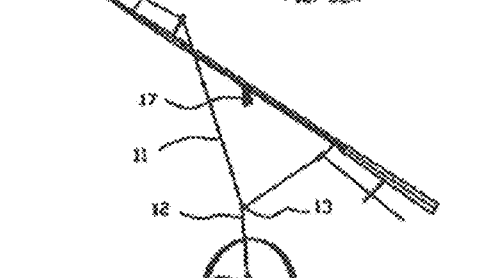

FIG. 33 is the perspective view showing the weight 1 is falling from the weight support 17. The falling of weight 1 is dragging down the fish line 11.

Figure 34:
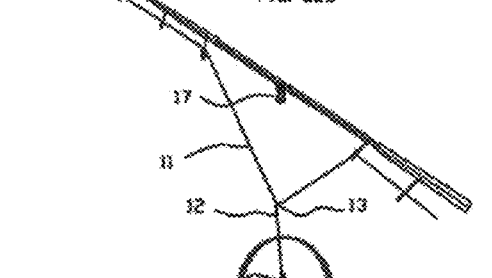

FIG. 34 is similar to FIG. 33, except all line guides are facing down.

FIG. 35A, FIG. 35B, FIG. 35C and FIG. 35D are the front view, the bottom view, the left view and the right view of weight 25, respectively.

FIG. 36A through FIG. 36D are the top view, the front view, the left view and the right view of the weight support 27.

FIG. 37A, FIG. 37B, FIG. 37C and FIG. 37D are the front view, the top view, the left view and the right view of the weight 25 supported by weight support 27.

FIG. 38A, FIG. 38B and FIG. 38C are the front view, the top view and the right view of the preferred embodiment 13. On these figures, the female thread 28 on the weight 25 is rotated onto male thread of the weight support 27 so that weight 25 is supported by weight support 27. The weight support adaptor 5 provides support for weight support 27. The fish line coupler 12 is connected to both the weight 25 and the fish line 11. Line guide 9 on the weight support adaptor 5 is facing downward, and line guide 10 is facing upward.

FIG. 39A is the perspective view of the preferred embodiment 13. It is a perspective view of FIG. 38A, FIG. 38B and FIG. 38C.

FIG. 39B is the perspective view of the preferred embodiment 14. FIG. 39B is similar to FIG. 39A, the difference is that both line guide 9 and 10 are facing down.

FIG. 40A, FIG. 40B and FIG. 40C are the front view, the top view and the right view of the preferred embodiment 19. The female thread 28 on the weight 25 is rotated onto the male thread of the weight support 27 so that weight 25 is supported by weight support 27. The weight support 27 is mounted on weight support adaptor 19. The fish line coupler 12 is connected to both the weight 25 and the fish line 11 by anchor 18 and fishing clip 13. Line guide 22 on the weight support adaptor 19 is facing downward, and line guide 23 is facing upward.

FIG. 41A is the perspective view of preferred embodiment 19. FIG. 41A shows the same embodiment as FIG. 40A, FIG. 40B and FIG. 40C.

FIG. 41B is the perspective view of the preferred embodiment 20. FIG. 41B is similar to FIG. 41A, the difference is that both line guide 22 and 23 are facing down.

Figures 42A, 42B, 42C, 42D, 42E, 42F:
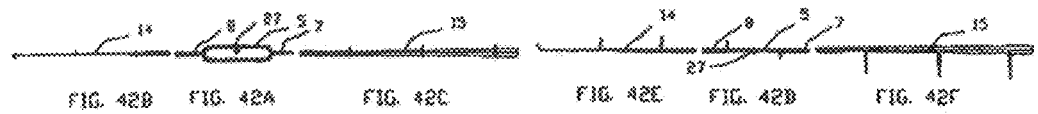

FIG. 42A is the top view of the weight support 27, and weight support adaptor 5 showing its female tip 8 on the left side and male tip 7 on the right side. Weight support 27 is mounted on weight support adaptor 5.

FIG. 42B is the top view of the upper section of the multi-sectional fishing rod with a male tip on the right side. The size of the male tip matches the size of the female tip 8 of the weight support adaptor 5 shown on FIG. 42A.

FIG. 42C is the top view of the lower section of the multi-sectional fishing rod with a female tip on the left side. The size of the female tip matches the size of the male tip 7 of weight support adaptor 5 shown on FIG. 42A.

FIG. 42D is front view of what is shown on FIG. 42A, FIG. 42E is front view of what is shown on FIG. 42B, and FIG. 42F is front view of what is shown on FIG. 42C, respectively.

Figures 43A, 43B:
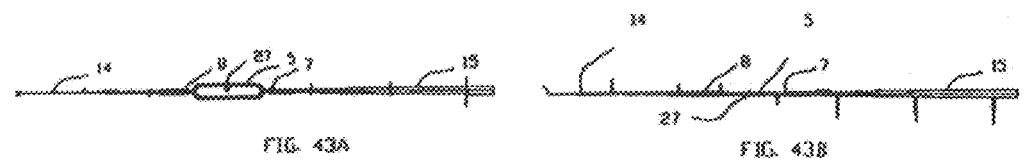

FIG. 43A is the top view of the installation of weight support adaptor 5 on both the upper section 14 and the lower section 15 of a multi-sectional fishing rod shown on FIG. 42B and FIG. 42C, after fitting the male tip of the upper section of the rod into the female tip 8 of the weight support adaptor 5 and female tip of the lower section of the fishing rod onto the male tip 7 of the weight support adaptor 5. Line guides to the left of the weight support 27 are facing upward and the rest are facing downward.

FIG. 43B is the front view of what is shown on FIG. 43A.

Figures 44A, 44B:
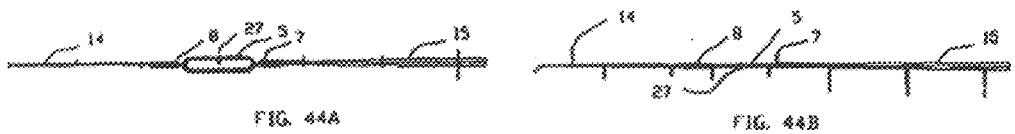

FIG. 44A and FIG. 44B is similar to FIG. 43A and FIG. 43B, respectively. The difference is that all line guides are facing downward.

Figures 45A, 45B:

FIG. 45A is the top view of the integrated fishing rod 16. Part of weight support adaptor 5 shown on FIG. 42A become permanent part of the rod. The female tip and male tip of the weight support adaptor 5 are eliminated by the integration. Two nearest line guides provide functionality of the line guide 9 and 10. Line guides to the left of the weight support 27 are facing upward and the rest are facing downward.

FIG. 45B is the front view of what is shown on FIG. 45A.

Figures 46A, 46B:
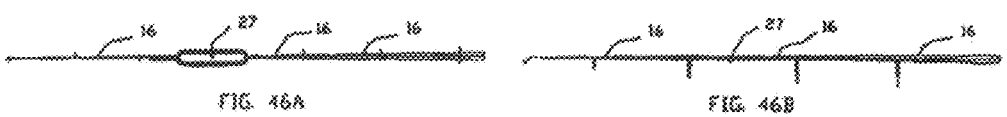

FIG. 46A and FIG. 46B are similar to FIG. 45A and FIG. 45B, respectively. The difference is that all line guides are facing downward.

Figure 47:
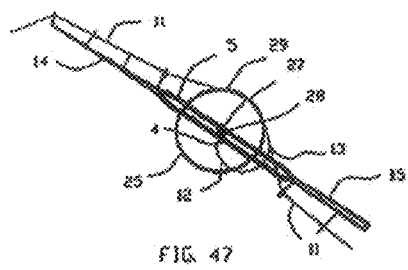

FIG. 47 is the perspective view of the preferred embodiment 15. The weight 25 is supported by the weight support 27 by coupling the male thread of weight support 27 and female thread of weight 25, and fish line 11 is passing through the fish line groove 29 of the weight 25. The coupler 12 connects weight 25 to fish line 11 through anchor 4 and fish line clip 13. The weight support adaptor 5 is fitted to sections of the fishing rod as shown by FIG. 43A. Line guides to the left of the weight support 27 are facing up, and line guides to the right of the weight support 27 are facing down.

Figure 48:
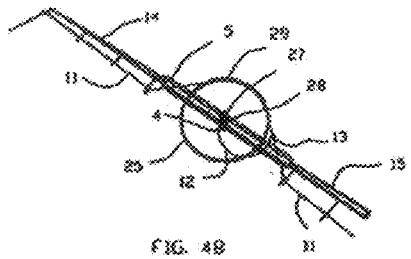

FIG. 48 is the perspective view of the preferred embodiment 16. FIG. 48 is similar to FIG. 47. The difference is that all line guides are facing downward.

Figure 49:
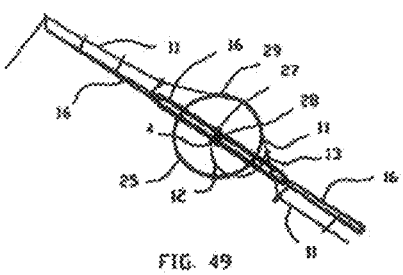

FIG. 49 is the perspective view of the preferred embodiment 17. FIG. 49 shows an integrated fishing rod 16. Parts of embodiment 13 shown on FIG. 39A become permanent parts of the rod. The female tip 8 and male tip 7 of the weight support adaptor 5 are eliminated by the integration. Line guides 9 and 10 are eliminated also, since line guide to the left and to the right of weight support 27 provide functionality of the line guide 9 and 10.

Figure 50:
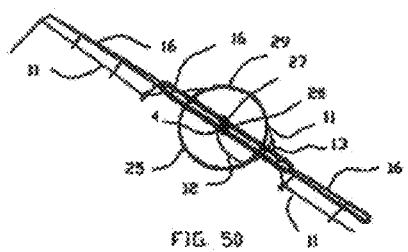

FIG. 50 is the perspective view of the preferred embodiment 18. FIG. 50 is similar to FIG. 49. The difference is that parts of embodiment 14 shown on FIG. 39B become permanent parts of the rod and all line guides are facing downward.

FIG. 51A is the top view of the weight support 27, and weight support adaptor 19 showing its female tip 20 on the left side and male tip 21 on the right side. Weight support 27 is mounted on weight support adaptor 19.

FIG. 51B is the top view of the upper section of the multi-sectional fishing rod with a male tip on the right side. The size of the male tip matches the size of the female tip 20 of the weight support adaptor 19 shown on FIG. 51A.

FIG. 51C is the top view of the lower section of the multi-sectional fishing rod with a female tip on the left side. The size of the female tip matches the size of the male tip 21 of the weight support adaptor 19 shown on FIG. 51A.

FIG. 51D is front view of what is shown on FIG. 51A; FIG. 51E is front view of what is shown on FIG. 51B; and FIG. 51F is front view of what is shown on FIG. 51C, respectively.

FIG. 52A is the top view of the installation of weight support adaptor 19 on both upper section 14 and lower section 15 of the fishing rod shown on FIG. 51B and FIG. 51C, after fitting the male tip of the upper section 14 of the rod into the female tip 20 of the weight support adaptor 19, and fitting the male tip 21 of the weight support adaptor 19 into female tip of the lower section 15 of the fishing rod. Line guides to the left of the weight support 27 are facing upward and the rest are facing downward.

FIG. 52B is the front view of what is shown on FIG. 52A.

FIG. 53A and FIG. 53B is similar to FIG. 52A and FIG. 52B, respectively, except that on FIG. 53A and FIG. 53B, all line guides are facing downward.

FIG. 54A is the top view of the integrated fishing rod 24. Parts of weight support adaptor 19 shown on FIG. 41A become a permanent parts of the rod 24. The female tip 20 and male tip 21 of the weight support adaptor 19 are eliminated by the integration. Two nearest line guides provide functionality of the line guide 22 and 23. Line guides to the left of the weight support 27 are facing upward and the rest are facing downward.

FIG. 54B is the front view of what is shown on FIG. 54A.

FIG. 55A and FIG. 55B is similar to FIG. 54A and FIG. 54B, respectively, except that on FIG. 55A and FIG. 55B, all line guides are facing downward.

FIG. 56 is the perspective view of the preferred embodiment 21. The weight 25 is supported by the weight support 27 by coupling the male thread of weight support 27 and female thread of weight 25, and fish line 11 is passing through the fish line groove 29 of the weight 25. The coupler 12 connects weight 25 to fish line 11 through anchor 4 and fish line clip 13. The weight support adaptor 19 is fitted to sections of the fishing rod as shown by FIG. 52A and FIG. 52B. Line guides to the left of the weight support 27 are facing up, and line guides to the right of the weight support 27 are facing down.

FIG. 57 is the perspective view of the preferred embodiment 22. FIG. 57 is similar to FIG. 56, except that all line guides are facing downward.

FIG. 58 is the perspective view of the preferred embodiment 23. The weight 25 is supported by the weight support 27 by coupling the male thread of weight support 27 and female thread of weight 25, and fish line 11 is passing through the fish line groove 29 of the weight 25. The coupler 12 connects weight 25 to fish line 11 through anchor 4 and fish line clip 13. The integrated fishing rod 24 eliminated the weight support adaptor 19 as shown on FIG. 54A and FIG. 54B. Line guides to the left of the weight support 27 are facing up, and line guides to the right of the weight support 27 are facing down.

FIG. 59 is the perspective view of the preferred embodiment 24. FIG. 59 is similar to FIG. 58, except that all line guides are facing downward.

FIG. 60A, FIG. 60B, FIG. 60C and FIG. 60D are the front view, the bottom view, the left view and the right view of the weight 30, respectively.

FIG. 61A is the front view of the preferred embodiment 25. FIG. 61A is similar to FIG. 1A, except the shape of the weight 30 is a variation of weight 1.

FIG. 61B is the top view of what is shown on FIG. 61A.

FIG. 61C is the front view of the preferred embodiment 26. FIG. 61C is similar to FIG. 61A, except that both line guide 9 and 10 are facing down.

FIG. 62A, FIG. 62B, FIG. 62C and FIG. 62D are the front view, the bottom view, the left view and the right view of a variation of weight 30, respectively.

FIG. 63A is the front view of the preferred embodiment 27. FIG. 63A is similar to FIG. 61A, except the shape of the weight 30 shown on FIG. 63A is a variation of weight 30 shown on FIG. 61A.

FIG. 63B is the top view of what is shown on FIG. 63A.

FIG. 63C is the front view of the preferred embodiment 28. FIG. 63C is similar to FIG. 63A, except that both line guide 9 and 10 are facing down.

FIG. 64A, FIG. 64B, FIG. 64C and FIG. 64D are the front view, the bottom view, the left view and the right view of the weight 31, respectively.

FIG. 65A is the front view of the preferred embodiment 29. FIG. 65A is similar to FIG. 1A, except an oval shaped weight 31 is used instead of using a round shaped weight 1.

FIG. 65B is the top view of what is shown on FIG. 65A.

FIG. 65C is the front view of the preferred embodiment 30. FIG. 65C is similar to FIG. 65A, except that both line guide 9 and 10 are facing down.

FIG. 66A, FIG. 66B, FIG. 66C and FIG. 66D are the front view, the bottom view, the left view and the right view of the weight 32, respectively.

FIG. 67A is the front view of the preferred embodiment 31. FIG. 67A is similar to FIG. 38A, except that in addition to fish line groove 29 on weight 25, the weight 32 has fish line groove 33, and the fish line 11 is on fish line groove 33 as shown.

FIG. 67B is the top view of what is shown on FIG. 67A.

FIG. 67C is the front view of the preferred embodiment 32. FIG. 67C is similar to FIG. 67A, except that both line guide 9 and 10 are facing down.

FIG. 68A, FIG. 68B, FIG. 68C and FIG. 68D are the top view, the front view, the left view and the perspective view of the weight 34, respectively. Preferred embodiment 33 employs the weight 34.

FIG. 69A, FIG. 69B and FIG. 69C are the front view, the left view and the top view of the weight support 43 for embodiment 33, respectively. FIG. 69D is similar to FIG. 69C, except the weight support 43 is rotated 90 degrees from the position shown on FIG. 69C. FIG. 69E is the perspective view of the support 43.

FIG. 70A and FIG. 70B are front view and top view of weight 34 and weight support 43, respectively. Weight 34 is supported by the weight support 43. FIG. 70C is similar to FIG. 70A, except the weight 34 is rotated 90 degrees from the position shown on FIG. 70A. FIG. 70D shows that weight 34 is falling from weight support 43. FIG. 70E is similar to FIG. 70B, except the weight 34 is rotated 90 degrees from the position shown on FIG. 70B.

FIG. 71A, FIG. 71B and FIG. 71C are front view, top view and perspective view of weight 34 and weight support 43, respectively, showing weight 34 is supported by the weight support 43, and weight support 43 is installed on the fishing rod 24.

FIG. 71D is the right view of what is shown on FIG. 71A. The difference is that weight 34 is rotated 90 degrees and is falling of from weight support 43.

FIG. 71E is the perspective view of what is shown on FIG. 71D.

FIG. 72A, FIG. 72B and FIG. 72C are the front view, the top view and the right view of the weight 44, respectively. FIG. 72D is the perspective view of the weight 44, after rotation from the position shown on FIG. 72A. Preferred embodiment 35 employs the weight 44.

FIG. 73A, FIG. 73B and FIG. 73C are the front view, the top view and the right view of the weight support 50, respectively. FIG. 73D is the enlarged perspective view of the weight 50.

FIG. 74A, FIG. 74B and FIG. 74C are the front view, the top view and the right view of weight 44 and weight support 50 showing weight 44 is supported by weight support 50. Weight 44 and weight support 50 are employed by preferred embodiment 35. FIG. 74D is the view of weight 44, after rotation from position shown on FIG. 74B. FIG. 74E is the perspective view of what is shown on FIG. 74A. On FIG. 74E, the weight 44 is rotated so that the rectangular magnetic body on the weight 44 is not in parallel to rectangular magnetic body on the weight support 50. FIG. 74F is a perspective view of weight 44 and weight support 50, showing weight 44 is falling from weight support 50.

FIG. 75 is front view of weight 44 and weight support 50 and fishing rod 24, showing weight 44 and weight support 50 are installed on fishing rod 24.

PREFERRED—EMBODIMENTS

The weight and weight support are key elements of this invention. They can be made in various shapes and different types. For example, the weight support can be a structure situated on one side of the fishing rod, or symmetrically situated on a fishing rod. The weight support can be mountable element installable to or removable from the fishing device through the use of a weight support adaptor. Or it can be a integrated part of the fishing rod or other fishing devices. The weight can be round shaped, oval shaped, fan shaped, bar shaped and other suitable shapes. The weight can be made of uniform material, or heavy material at the center and light material for off-center part for increasing the leverage and sensitivity the weight, making it possible for a small force on the fish line to rotate the weight. The weight can have more than one fish line grooves with different diameters to achieve different timing and different sensibility. Beside the easy to see, cut off type opening on the weight, a center hole on the weight with a female thread can also be an opening, provided that the weight support has a matching male thread for coupling and decoupling of the weight, and the weight support structure has space allowing the weight to rotate out of the weight support. The matching shapes between the weight and the weight support provide the coupling and decoupling positions between the two. The coupling positions are referred as the non-opening positions, and decoupling positions are also referred as the opening positions in this document.

The weight support has two basic types, adaptive weight support and integrated weight support. Adaptive weight support can be mounted on or be dismounted from a fishing device, such as a fishing rod. It can be mounted directly on a fishing device, or be mounted on a fishing device through an adaptive weight support adaptor. An adaptive weight support adaptor is suitable for both existing fishing devices and new fishing devices. Integrated weight support is a built in part of the fishing. The weight support adaptor is not needed if the weight support is built in into the fishing devices. An integrated weight support is suitable mainly for new fishing device.

Embodiment 1

Refer to FIG. 1A through FIG. 1D. FIG. 1A through FIG. 1D demonstrate a stand along accessory to add automatic functions for both existing and new sectional type fishing rods. Embodiment 1 employs a round shaped weight 1 with a center hole and an opening 3 shaped as a cut off gap from the center of the weight to its edge. The diameter of the hole is slightly larger than the diameter of the inner cylinders of the weight support 6 so that the weight can freely rotate on the weight support. The cut off gap is narrow at the center and gradually wider toward outer edge of the weight. There is a fish line groove 2 on the center of the outer edge of the weight 1. The anchor 4 on the weight 1 is for attaching the coupler 12 to the fish line 11 through fish line clip 13. The weight 1 is supported by the weight support 6. The fish line 11 goes through line guide 9, inner space of weight support adaptor 5, and top portion of the fish line groove 2 of the weight 1, and line guide 10. The fish line 11 contacts the top portion of the fish line groove 2, not the bottom side of the groove so that fish line can press the weight on the weight support to make it stable, and when the weight starts to fall, the fish line is not in the position to support the weight and block the falling path. The line guide 9 is facing down and line guide 10 is facing up on the weight support adaptor 5. One side of the weight support adaptor 5 has a male tip 7 for inserting into a female tip of a lower section of a multi-sectional type fishing rod. Another side has a female tip 8 for receiving a male tip of upper section of the multi-sectional type fishing rod. The sectional type fishing rod is the one with at lest two sections which can be attached together by a male tip on one section and a female tip on another section.

FIG. 2A through FIG. 2D provide detailed views of the weight 1. FIG. 3 shows position and the enlarged view of weight support 6 on weight support adaptor 5. The detailed views of the weight support are shown by FIG. 4A through FIG. 4D. The gap between the two halves of the weight support 6 allows the fish line 11 and the coupler 12 to go up and down in the inner space of the weight support adaptor without blockage. The gap is wider at the upper side and narrower at the lower side. This is to make the fish line and the coupler to go down with less chances of interference when the weight is falling. Rotate the weight support adaptor 180 degree along the direction of the fish line will make the wider side down, this will provide more supporting surface but increase the chance of the interference. FIG. 5A through FIG. 5D are views of the weight support 6 supporting the weight 1. The weight is contacting the round surface of the two smaller cylinders, and the inner straight surfaces of the two bigger cylinders keep the weight straightly supported. The radius of the half hole at the center of the weight is slightly large than the radius of the smaller cylinder of the weight support, and the distance between the two halves of the big cylinder showing on FIG. 4A, FIG. 4C, and FIG. 4D is slightly larger than the thickness of the weight 1 to allowing free rotation of the weight 1 on the weight support 6. Proper tolerances allow smooth rotation of the weight without waving movement.

Refer to FIG. 6A, FIG. 6B and FIG. 6C for views of weight 1 and weight support 6 after rotating weight 1 on weight support 6 from position shown on FIG. 5A. FIG. 7 is the top view of the weight support adaptor 5 with the weight support 6 and the weight 1. It shows that all these elements are symmetrically situated. FIG. 1C shows that the fish line 11 goes through line guides 9, upper portion fish line groove 2 of the weight 1 and line guides 10. On FIG. 1C, the weight 1 is rotated counter clockwise close to a position at which the weight 1 will fall. Further rotation will cause it fall from the weight support 6, dragging the fish line 11 down with it, since the fish line 11 is connected to the weight 1 through the anchor 4, coupler 12 and fish line clip 13. For embodiment 1, the female tip 8 of the weight support adaptor 5 is for adapting to the upper section of the multi-sectional fishing rod. The male tip 7 of the weight support adaptor 5 is for adapting to the lower section of the multi-sectional fishing rod. Since the fish line is relatively tighter at the end of rod side and looser at the fish hook side, the falling weight will pull the line and drag the hook toward the fishing rod. The pulling of the line will set the hook.

Embodiment 1 is an adaptive type accessory to add automatic functions to both existing and new sectional type fishing rods.

The Embodiment 3

Refer to FIG. 20A and FIG. 20B, this embodiment uses an adaptive device described in embodiment 1 to adapt into the both upper section 14 and lower section 15 of a sectional type fishing rod. FIG. 17A through FIG. 17C are top view of upper section of a fishing rod, the weight support adaptor 5 with male tip 7 and female tip 8, and a lower section of a fishing rod, respectively. FIG. 17D through FIG. 17F are their respective front views. After fitting the male tip of the upper section 14 of the fishing rod into the female tip 8 of the weight support adaptor 5, and fitting the male tip 7 of the weight support adaptor 5 into the lower section 15 of the rod, the support adaptor 5 is adapted on the rod as shown by top view FIG. 18A. FIG. 18B is the front view of FIG. 18A. Line guides on the fishing rod left to the weight support 6 are all facing upward, the rest are facing downward.

Embodiment 3 is an application of embodiment 1 to add automatic functions for both existing and new sectional type fishing rod.

The Embodiment 5

Refer to FIG. 21A and FIG. 21B, this embodiment uses an integrated weight support to have the weight support adaptor integrated into the fishing rod 16, thus eliminated the male tip 7, female tips 8, line guide 9 and 10. The two nearest line guides on each side of the weight support 6 provide the function of the line guide 9 and line guide 10. Line guides on the fishing rod left to the weight support 6 are all facing upward, the rest are facing downward. The fishing rod 16 can be a one-piece construction rod, or a multi-sectional rod.

The Embodiment 6

Refer to FIG. 21C and FIG. 21D, this embodiment is similar to the embodiment 5, except all line guides on the fishing rod are facing downward.

The Embodiment 7

Refer to FIG. 24D, this embodiment uses an adaptive weight support adaptor 19 and weight support 17. Unlike embodiments described above that use weight 1, weight support 6, and weight support adaptor 5, weight 1 and weight support 17 here are not symmetrically situated. Female tip 20 and male tip 21 are for adapting the weight support adaptor 19 into a sectional fishing rod. Line guide 22 is facing up and line guide 23 is facing down. FIG. 23A through FIG. 23E are views of the weight support 17 on weight support adaptor 19 without the weight 1. FIG. 24A, FIG. 24B and FIG. 24C are front view, top view and right view of weight 1 supported by weight support 17 on weight support adaptor 19. FIG. 22A, FIG. 22B, and FIG. 22C are views of the weight 1. The anchor 18 for fish line coupler 12 is extended out, as shown by FIG. 22C and FIG. 24C. The extension makes it less likely for the coupler 12 to interference the rotation or the falling of the weight 1.

Similar to embodiment 1, embodiment 7 employs an adaptive type weight support. The difference is that unlike embodiment 1, embodiment 7 employs weight support 17 and the weight support adaptor 19 instead of using weight support 6 and the weight support adaptor 5. Embodiment 7 can be used as a stand along accessory to add automatic functions for both existing and new sectional type fishing rods.

Embodiment 8

Refer to FIG. 24E, embodiment 8 employs the same components as embodiment 7, except both line guides 22 and line guide 23 are facing downward. Similar to embodiment 7, this embodiment employs an adaptive weight support adaptor 19, weight support 17 and can be used as a stand along accessory to add automatic functions for both existing and new sectional type fishing rods.

The Embodiment 9

Refer to FIG. 29A and FIG. 29B, this embodiment uses an adaptive weight support to have the weight support adaptor 19 adapted onto both the upper section 14 and lower section 15 of a multi-sectional type fishing rod. FIG. 25A, FIG. 25B, and FIG. 25C are top views of the individual components before they are adapted to each other. FIG. 25D, FIG. 25E, and FIG. 25F are their respective front views. After inserting the male tip of the upper section 14 into the female tip 20 of the weight support adaptor 19, and inserting the male tip 21 of the weight support adaptor 19 into the female tip of the lower section 15, as shown by the top view FIG. 26A and front view FIG. 26B, the physical installation of multi-sectional rod to the weight support adaptor is achieved. Setup of weight 1, anchor 18, fish line 11, coupler 12 and fish line clip 13 are similar to embodiment 7.

Embodiment 9 is an application of embodiment 7 to add automatic functions to both existing and new-sectional type fishing rod.

Embodiment 10

Refer to FIG. 30A and FIG. 30B, this embodiment is similar to embodiment 9, except that it is an application of embodiment 8 to add automatic functions to both existing and new sectional type fishing rods. All line guides are facing downward, and the setup of weight 1, anchor 18, fish line 11, coupler 12 and fish line clip 13 is similar to embodiment 8.

Embodiment 11

Refer to FIG. 31A and FIG. 31B, this embodiment employs an integrated weight support to have the weight support adaptor 19 integrated into the fishing rod 24, thus eliminated both male tip 21 and female tips 20, and line guide 22 and 23. The two nearest line guides on each side of the weight support adaptor 19 provide the functionality of the line guide 22 and line guide 23. Line guides on the fishing rod to the left of weight support 6 are all facing upward, the rest are facing downward. The setup of weight 1, anchor 18, fish line 11, coupler 12 and fish line clip 13 is similar to embodiment 7.

Embodiment 12

Refer to FIG. 32A and FIG. 32B, this embodiment is similar to embodiment 11, except all line guides on the fishing rod are facing downward and the setup of weight 1, anchor 18, fish line 11, coupler 12 and fish line clip 13 is similar to embodiment 8.

Embodiment 13

Refer to FIG. 39A; embodiment 13 employ a round shaped weight 25 with a center hole but without the cut off gap that existed on weight 1. There is a female thread 28 in the hole of weight 25 to match a male thread of weight support 27, as shown by FIG. 35A through FIG. 35D and FIG. 36A through FIG. 36D. FIG. 37A through FIG. 37D are view of weight 25 supported by weight support 27 after rotate the weight 25 clockwise onto the thread of weight support 27. The coupling of weight 25 and weight support 27 is loose enough to allow free rotation of weight 25 on weight support 27. There is a fish line groove 29 on the center of the outer edge of the weight 25. The anchor 4 of the weight is for attaching the coupler 12 to the fish line 11 through fish line clip 13. The fish line 11 goes through line guide 9, inner space of weight support adaptor 5, top portion of the fish line groove 29 of the weight 25 and line guide 10. The line guide 9 is facing up and line guide 10 is facing down. One side of the weight support adaptor 5 has a male tip 7 for adapting into a female tip of a lower section of multi-sectional type fishing rod. Female tip 8 on another side of the weight support adaptor 5 is for receiving a male tip of upper section of multi-sectional type fishing rod. FIG. 38A, FIG. 38B and FIG. 38C are front view, top view and right view of embodiment 13. FIG. 38B shows that the inner space of the weight support adaptor 5 is wide enough to allow the weight 25 to rotate into and to rotate out from the weight support 27.

Embodiment 13 is an adaptive type device employing the weight support adaptor 5. It can be used as a stand along accessory to add automatic functions for both existing and new sectional type fishing rods.

Embodiment 14

Refer to FIG. 39B; this embodiment is similar to Embodiment 13, employing same components as Embodiment 13, except that both line guide 9 and line guide 10 are facing downward. Embodiment 14 is also an adaptive type device using the weight support adaptor 5. It can be used as a stand along accessory to add automatic functions for both existing and new sectional type fishing rods.

Embodiment 15

Refer to FIG. 47; this embodiment employs an adaptive weight support to have the weight support adaptor 5 adapting into both upper section 14 and lower section 15 of a sectional type fishing rod. It is an application of embodiment 13 for adding automatic functions to sectional type rods. FIG. 42B and FIG. 42E are top view and front view of upper section 14 respectively. FIG. 42C and FIG. 42F are top view and front view of lower section 15, respectively. FIG. 42A and FIG. 42D are top view and front view of weight support adaptor 5, respectively. FIG. 43A is the top view of upper section 14, weight support adaptor 5 and lower section 15 all installed together by matching the male tip of the section 14 to the female tip 8 of weight support adaptor 5, and matching the female tip of section 15 to the male tip of weight support adaptor 5 together. FIG. 43B is the front view of FIG. 43A. Line guides on the fishing rod to the left of weight support 6 are facing upward, the rest are facing downward.

The Embodiment 16 : Refer to FIG. 48; this embodiment is similar to embodiment 15 by using an adaptive weight support. It is an application of embodiment 14 for adding automatic functions to sectional type rods. Unlike embodiment 15, all line guides are facing downward.

Embodiment 17

Refer to FIG. 49; this embodiment employs an integrated weight support to have the weight support adaptor integrated into the fishing rod 16, thus eliminated both the male tip 7, female tips 8, line guide 9 and line guide 10. The two nearest line guides on each side of the weight support 6 provide the functionality of the line guide 9 and line guide 10. Line guides on the fishing rod to the left of weight support 6 are all facing upward, the rest are facing downward.

Embodiment 18

Refer to FIG. 50; this embodiment is similar to embodiment 17 by integrating weight support adaptor into the fishing rod 16, except that all line guides are facing downward.

Embodiment 19

Refer to FIG. 41A, this embodiment is similar to embodiment 13 that employs a adaptive weight support adaptor, except the weight 25 is situated non-symmetrically, on the side of the weight support adaptor 5. Female tip 20 and male tip 21 are for adapting the weight support adaptor 19 into a sectional fishing rod. FIG. 40A, FIG. 40B and FIG. 40C are front view, top view and right view of weight 25 supported by weight support 27 on weight support adaptor 19. Line guide 22 is facing up and line guide 23 is facing down.

Similar to embodiment 13, embodiment 19 can be used as a stand along accessory to add automatic functions for both existing and new sectional type fishing rods.

Embodiment 20

Refer to FIG. 41B, embodiment 20 employs the same components as embodiment 19, except both line guide 22 and line guide 23 are facing downward. Similar to embodiment 19, this embodiment employs the weight support adaptor 19, and can be used as a stand along accessory to add automatic functions for both existing and new sectional type fishing rods.

Embodiment 21

Refer to FIG. 56; FIG. 56 is the front view of embodiment 21. This embodiment employs an adaptive weight support to have weight support adaptor 19 adapted into both upper section 14 and lower section 15 of a sectional type fishing rod. FIG. 51A is the top view of the weight support 27, weight support adaptor 19, female adapting tip 20 and male adapting tip 21; FIG. 51B is the top view of upper section of a sectional fishing rod 14; and FIG. 51C is the top view of lower section of a sectional fishing rod 15, before they are adapted to each other. FIG. 51D, FIG. 51E, and FIG. 51F are their respective front views. After inserting the male tip of the upper section 14 into the female tip 20 of the weight support adaptor 19, and inserting the male tip 21 of the weight support adaptor 19 into the female tip of the lower section 15, as shown by the top view FIG. 52A and front view FIG. 52B, the physical installation of multi-sectional rod to the weight support adaptor 19 is achieved. The setup of weight 25, anchor 4, fish line 11, coupler 12 and fish line clip 13 is similar to embodiment 19.

Embodiment 21 is an application of embodiment 19 to add automatic functions to both existing and new sectional type fishing rod.

Embodiment 22

Refer to FIG. 57; this embodiment is similar to embodiment 21 by using an adaptive weight support. It is an application of embodiment 20 for adding automatic functions to both existing and new sectional type rods. Unlike embodiment 21, all line guides are facing downward.

The Embodiment 23

Refer to FIG. 58; embodiment 23 is similar to embodiment 21 except it uses an integrated weight support to have the weight support adaptor integrated into the fishing rod 24, thus eliminated both the male tip 21 and female tips 20 and two line guides. The two nearest line guides on each side of the weight support 27 provide the function of the eliminated line guides. Line guides on the fishing rod left to the weight support 6 are all facing upward, the rest are facing downward.

The Embodiment 24

Refer to FIG. 59; this embodiment is similar to embodiment 23 by integrating weight support adaptor into the fishing rod 24, except that all line guide are facing downward.

The Embodiment 25

Refer to FIG. 61A and FIG. 61B, this embodiment is similar to the embodiment 1, using same components except that weight 30 replaces the weight 1. Similar to embodiment 1, embodiment 25 is an adaptive type accessory to add automatic functions to both existing and new sectional type fishing rods.

The Embodiment 26

Refer to FIG. 61C, this embodiment is similar to the embodiment 25, using same components, except that both line guide 9 and 10 are facing down.

The Embodiment 27

Refer to FIG. 63A and FIG. 63B, this embodiment is similar to the embodiment 25, using same components except that the weight 30 is a variation of weight 30 shown on embodiment 25. Similar to embodiment 25, embodiment 27 is an adaptive type accessory to add automatic functions to both existing and new sectional type fishing rods.

The Embodiment 28

Refer to FIG. 63C, this embodiment is similar to the embodiment 27, using same components, except that both line guide 9 and 10 are facing down.

The Embodiment 29

Refer to FIG. 65A and FIG. 65B, this embodiment is similar to the embodiment 1, using same components except that weight 31 replaces the weight 1. Similar to embodiment 1, embodiment 29 is an adaptive type accessory to add automatic functions to both existing and new sectional type fishing rods.

The Embodiment 30

Refer to FIG. 65C, this embodiment is similar to the embodiment 29, using same components, except that both line guide 9 and 10 are facing down.

The Embodiment 31

Refer to FIG. 67A and FIG. 67B, this embodiment is similar to the embodiment 13, using same components except that weight 31 replaces the weight 29. Similar to embodiment 13, embodiment 29 is an adaptive type accessory to add automatic functions to both existing and new sectional type fishing rods.

The Embodiment 32

Refer to FIG. 67C, this embodiment is similar to the embodiment 31, using same components, except that both line guide 9 and 10 are facing down.

The Embodiment 33

Refer to FIG. 71A, FIG. 71B, FIG. 71C, FIG. 71D and FIG. 71E, this embodiment employ weight 34 and weight support 43 as shown by FIG. 70A, FIG. 70B, FIG. 70C, FIG. 70D and FIG. 70E. Refer to FIG. 68A, FIG. 68B, FIG. 68B, and FIG. 68D, weight 34 has a hole 35, facing downward. A small hole 37 is drilled through the upper ceiling of the hole 35. There is an opening notch 36 at the center of hole 35. The width of the notch 36 is shorter than the diameter of the small hole 37, and the length of the notch 36 is longer than the diameter of the small hole 37. Hole 35 and small hole 37 and notch 36 form a partial flat female thread having just one thread. This female thread can couple with a partial flat male thread having just one thread on the lower part of weight support 43. Refer to FIG. 69A, FIG. 69B, FIG. 69C, FIG. 69D and FIG. 69E for views of weight support 43. Weight support 43 can be installed on a fishing rod. It's axle 40 fits into small hole of weight 34. If the sticking out ping 41 is in parallel position with notch 36, the weight 34 can hang onto weight support 43 through small hole 37 by rotating weight 34 around axle 40. Weight 34 can also be rotated out of weight support 43. Direction of the rotation can be clockwise or counter clockwise. The use of the round plate 42 of the weight support is to balance the weight 34, prevent it from tilting sideways. FIG. 70A and FIG. 70B show that weight 34 is hanging on weight support 43. FIG. 70C, FIG. 70E shows the position under which the weight 34 cannot be hang on the weight support 43. FIG. 70D shows that weight 34 is falling from weight support 43. FIG. 71A, FIG. 71B, FIG. 71C shows weight 34 is supported by weight support 43 which is in turn supported by fishing rod 24. Weight 34 is positioned right under the fishing rod 24, in between two adjacent line guides. Fish line 11 goes through fish line groove 38 of the weight 34. Coupler 12 connects weight 34 to fish line 11 through anchor 39 on the weight 34 and clip 13. FIG. 71D, FIG. 71E shows the falling of weight 34 from weight support 43. The way to install and use weight 34 and weight support 43 in embodiment 33 is very similar to embodiments that use weight 25 and weight support 27. This is because weight 34 and weight support 43 are transformed from weight 25 and weight support 27. The thread on weight 25 and weight support 27 are continues, not flat, but the thread on weight 34 and weight support 43 are not continues and flat.

Weight support 43 can be integrated with a fishing rod, it can also be an adaptive device to add automatic fishing functions to existing or new fishing rod.

Embodiment 34 changing the sticking out ping 41 to be sticking out on only one side from axle 40, and changing the opening notch 36 to have only one side opening, the result is the maximum rotation angle the weight can stay supported by the weight support 43 is increased from close to 180 degree to close to 360 degree. The direction of weight 34 rotating into and rotating out from weight support 43 can be clockwise, or counter clockwise.

Embodiment 35

Refer to FIG. 75, this embodiment employ weight 44 and weight support 50 as shown by FIG. 74A, FIG. 74B, FIG. 74C, FIG. 74D, FIG. 74E and FIG. 74F. Refer to FIG. 72A, FIG. 72B, FIG. 72B, and FIG. 72D, weight 44 has a rectangular magnetic block 46. There is a hole 45 on magnetic block 46. Magnetic block 46 can be either permanent magnetic material or non-permanent magnetic material. Refer to FIG. 73A, FIG. 73AB, FIG. 73C and FIG. 73A for views of weight support 50. Weight support 50 can be installed on a fishing rod. Its axis 51 can fit into small hole 45 of the weight 44, allowing the weight 44 to rotate on the weight support 50. Weight support 50 has a rectangular magnetic block 49. Magnetic block 49 can be either permanent magnetic material, or non-permanent magnetic material. If magnetic block 49 is non-permanent magnetic material, the magnetic block 46 on the weight needs to be permanent magnetic material. Except the magnetic block 46, other parts of weight 44 cannot be magnetized. Except the magnetic block 49, other parts of weight support 50 cannot be magnetized. The magnetic block 49 of the weight support 50 can attract magnetic block 46 of the weight 44. If one of them is not permanent magnetic material, it can be magnetized by the other which is permanent magnetic material. The attraction between magnetic block 49 and magnetic block 46 can let weight support 50 to hold weight 44 when axis 51 is fitted into small hole 45, and they are lined up in parallel, plus their magnetic rods are in opposite directions, as shown in FIG. 74A and FIG. 74B. If weight 44 rotates to reduce the attraction force between them, weight 44 will fall from weight support 50, as shown by FIG. 74E and FIG. 74F. FIG. 75 shows that weight 44 is support by weight support 50 that is installed on fishing rod 24. Weight 44 is placed under fishing rod 24, between to adjacent line guides. Fish line 11 passes through fish line groove 47. Coupler 12 connects weight 44 through the anchor point 39 to fish line 11 through clip 13. The movement of the fish line 11 can rotate weight 44 to let it fall down from weight support 50.

Weight support 50 can be built into a fishing rod, or can also be an adaptive device to add automatic fishing capabilities to new or existing fishing rod.

For each pair of embodiment 25 and 26, 27 and 28, 29 and 30, 31 and 32, two more embodiments can be formed for adapting individual embodiment into sectional fishing rods; two more embodiments can also be formed for integrating individual embodiment into new fishing rods. Further more, for each pair, four more embodiments can be formed by differentiating whether the weight is situated on the side of fishing device or situated along the centerline of the fishing rod. More embodiments can be formed by incorporate individual embodiment into fishing devices other than fishing rods. This is true for embodiment pair 1 and 2, 7 and 8, 13, and 14, 19 and 20. The usefulness of having more than one fish line groove on the weight can apply to embodiments 1 through 30. This will make this fishing device more way to adapt to fishing environment and make the device more flexible.

Similar variations can also apply to embodiment 33, embodiment 34 and embodiment 35.

Embodiments described above also show that by varying the shape of the weight, or the shape of the weight support, or both, numerals other embodiments can be formed using the same operating principles.

Embodiments provided above are for illustrating some of the many ways to construct this automatic fishing device; it should not be construed as limiting the scope of the invention but as merely providing illustrations of some of the presently preferred embodiments of this invention. Numerous other embodiments and ramifications are possible. Thus the scope of the invention should be determined by the appended claims and their legal equivalents, rather than by the examples of embodiments given.

Operations

Operations of this invention are very similar among different embodiments. If this invention is employed on a fishing rod, operation differences are determined mainly by whether the weight is symmetrically situated or situated on the side of fishing rod, and by whether all line guides are facing down or not. If this invention is employed to devices other than a fishing rod, the operations of this invention are similar to that of fishing rod operations.

1. When angler sets the fishing device that employs this invention, the height of the weight support from a solid surface underneath determines the falling distance of the weight. This height determines the maximum distance the weight can fall and maximum relocation distance of fishing hook at the end of the fish line. If the weight is above a water surface, the height of the weight support from the water surface can be reduced, since the maximum distance the weight can fall includes the water depth. For fishing rods with very short length, one can use a taller rod holder to increase the height of the weight support. For fishing rods with average or above average length, an ordinary rod holder to support a tilted rod should provide adequate height clearance for the weight. If other device is supporting the weight support adaptor or weight support other than a fishing rod, this height requirement should be satisfied.

2. When an angler prepares the fishing rod or other fishing device to incorporate this automatic fishing device, there are operational variations depending on the differences of the weight, weight support, weight support adaptor and direction of line guides. When prepare a fishing rod that employs embodiment that has a symmetrically situated weight and has line guides facing up such as embodiment 1, 3, 5, 13, 15, 17, 25, 27, 29 and 31, the fish line needs to go through the inner space of the symmetrical weight support adaptor structure. After casting the hook and bait into the water, making the fishing rod supported by rod holder to make the weight support has adequate height as required by step 1, and make the fish line somewhat tight as usual, the weight is placed on the weight support. For embodiment 2, 4, 6 and others where the line guides are all facing down and a symmetrically situated weight is used, the weight can be placed onto the weight support from under the weight support, with the opening of the weight facing up to push the fish line up using the fish line groove. The weight can then be turned against the weight support to let the opening facing down so that the weight can be supported. FIG. 13A shows the result of pushing the line from under. The alternative is to press the fish line up and to pick it up from inner space of the weight support adaptor, then place the weight on to the weight support with the opening of the weight facing down; the fish line can then be placed on to the fish line groove of the weight. For embodiment 14, 16 and 18, fish line can also be pushed up using the fish line groove from under the rod then rotate the weight onto the weight support. The alternative is also to press the fish line up and to pick it up from inner space of the weight support adaptor, then rotate the weight on to the weight support; the fish line can then be placed on to the fish line groove of the weight. For other embodiments, the fish line can be readily picked up first while the weight is either placed on or rotated on the weight support; the fish line can then be placed on to the fish line groove of the weight. Once the weight is supported by the weight support and the fish line is placed on the fish line groove, the fish line should be made tight enough to prevent the movement of the weight.

3. Angler then connects fish line coupler 12 that is anchored on the weight to fish line by using the fish line clip 13. If the fish line gets loose in the above processes, make the line tight again.

4. When fish strikes, the moving fish line rotates the weight either clockwise or counter clockwise. If the fish bite away from the angler, the fish line will make the weight 1 rotate counter clockwise. If the fish bites toward the angler, then the fish line will rotate the weight clockwise. This is because the tension change of the fish line from tight to loose. For embodiment that has a gap opening such as embodiment 1 through 12, 25 through 30, either rotation can cause the weight to fall. For embodiment 13 through 24, 31 and 32, which do not have bi-directional effectiveness, only counter clockwise rotation can make the weight fall. The sudden fall of weight will drag the fish line down. This causes the tightening of the fish line to set the fish. For embodiments with a symmetrically employed weight support adaptor, the weight, the fish line, the fish line coupler and fish line clip fall through the inner space of the adaptor. That is why the fish line anchor is not extended out from the weight to avoid blockage by either weight support or the weight support adaptor. Unlike many automatic hook setting devices that can only work when direction of a fish bite is away from the angler, embodiments 1 through 12, 25 through 30 and other possible embodiments alike, this invention can work bi-directionally, regardless which way the fish strike is.

5. While a hooked fish is struggling to escape, the weight can help to retain the tension of the fish line, preventing fish to escape. In some cases, such as a sudden and powerful pull by the fish while the weight is consuming some length of the fish line, the hanging weight can be an additional aid to the flexible fishing rod tip to prevent the fish to get away.

6. Once the angler knows that a fish is hooked, the angler can let the weight continue to be connected to the fish line; the angler can also remove the weight from fish line by unclip the fish line clip 13, pulling the fish without the use of weight.

7. Angler does not have to rely on this automatic fishing device for setting the hook. Before the weight to fall from the weight support, angler may decide to lift the rod without waiting the weight to fall. The penalty for overriding the functionality of this device is negligible. If the fish is hooked, the weight can also be disengaged from the fish line. This invention provides a fisherman a useful tool; one can overrides the mechanical functions as condition arise. The engagement and disengagement of weight from the fish line is simple and can be made almost instantly.

Benefits

1. Majority of automatic fishing devices and automatic hook setting devices only work when fish strike direction is away from the fishing device, causing the tightening of the fish line. They are ineffective if the fish strike direction is toward the fishing device, causing the loosening of the fish line. When fishing without automatic devices, it is hard for anglers to have the good timing to lift the rod when the fish line suddenly loosens. It is quite often that after notice the loosening of the fishing, angler tries to lift the rod, only to find that the good opportunity was lost. Except embodiments that use thread coupling and de-coupling between the weight and the weight support, this invention has the bi-directional effectiveness. It works when fish strike direction cause the fish line to be loosening, rotating the weight clockwise to let the weight to fall. Since there is tension on the fish line before the loosening of the line occurs, change of the tension can make the weight rotate and fall.

2. The automatic fishing devices described here are sensitive and easy to adjust to fit fishing environment. Since the radius of the fish line groove on the weight is much bigger than the radius of the cylinder of weight support, small force provided by the passing fish line through the fish line groove of the weight will be able to rotate the weight. This leverage greatly increases the sensibility of the device. In windy weather, angler may adjust the initial position of the weight position so that in order for the weight to fall, the fish line needs to provide more rotation to cause the weight to fall. Angler can adjust this initial position to adapt to striking habits of different fish, or optimal position for achieving the bi-directional effectiveness. If the weight is constructed like the one shown on embodiment 31 and 32, angler can have more than one fish line groove to choose from for different sensibility of the device, in addition to adjusting the amount of thread used for setting up the initial position of the weight relative to the weight support. An oval shaped weight can also make the weight easier to be rotated by the fish line if it is positioned upright initially.

3. The current invention uses the weight to drag down the fish line to set the hook. This helps the angler when he or she is not watching the fishing apparatus attentively, or he or she is not alert enough to react to fish strikes quickly enough. The current invention can also exert proper force to the fish line. In the case of weight fall due to loosening of the fish line, the falling weight will accelerate in falling speed. The effect of this accelerating in falling speed of the weight on the fish line is superior to the effect of a bounce up of the tip of the fishing rod. The former has an increasing force, and the later has a decreasing force, since, as the tip of the rod became bend less, the potential force it has to resume to its straight state is less.

4. The current invention will not force the user to abandon the old fishing habits. In certain circumstances, angler can lift the rod anytime without waiting for the weight to fall. Angler can also remove the weight when pulling a hooked fish. Installing the weight on weight support, or removing of the weight from weight support is simple job and can be done quickly.

5. The current invention make the short rod to approach effects of a longer rod, or a less flexible rod to approach the effects of the more flexible rod. The weight can go up and down with a struggling fish, making harder for the fish to escape, and making it less likely for the hooked fish to break the line. In case the weight falls into deep water, such as fishing in the sea, the extra balance of force the weight provided can be more beneficial.

6. The current invention can improve the efficiency of the angler. Chances of lifting the rod in response of fish strike without getting a hooked fish vary from angler to angler. Experiences of angler are certainly a big factor. In most cases, after the lift the conventional rod without hooking the fish, angler has to change bait, or casts the line again, or both. Since the pull of the line may drop the bait, or largely relocated the hook. When re-casting the line, angler is likely to re-cast the hook into the same spot where fish strike occurs, but the result may not be always desirable. Inaccurate cast means a possible longer wait for the next bite. When current invention is used, if the weight is not falling into deep sea water or drop from high place to the ground, a few feet fall of the weight only relocate the hook a short distance. The short relocation of the hook may still keep the bait on the hook, and have good chance that the nearby fish can still sense it. Angler can just reset the weight on the weight support, not rolling in the hook and re-cast. The results is saving time and increase the fishing efficiency.

7. The current invention uses simple elements; it is light in weight; easy to carry, easy to install. It is easy to manufacture and commercialize. It can be a low cost, practical fishing apparatus.

8. The current invention has good adaptability. It can be easily mounted on a fishing rod, on a fishing boat, or simply a piece of wood block. It can be used in shallow or deep water, in the sea or on the shore of sea, river, or lake.

The invention claimed is:

1. An automatic fishing device comprising a substantially disc shaped weight, having a weight support means adapted to connect to a fishing assembly;

said weight comprising a curved passage along its outer edge, a weight coupler means provided substantially at the center of said weight for detachably attaching said weight to said fishing assembly, a fishing line coupler provided on said weight for detachably attaching said weight to a fishing line of said fishing assembly;

wherein said fishing line is projected into a body of water and is subsequently placed in said curved passage, said weight is attached to said weight support means, and said fishing line coupler is connected to said fishing line;

whereby when a biting fish tensions said fishing line said weight will rotate to detach and drop from said weight support means, thereby tensioning said fishing line coupler and subsequently said fishing line to provide a hooking effect to said biting fish.

2. A method of automatically hooking a fish utilizing the device of claim 1.

* * * * *